United States Patent [19]
Kawazome et al.

[11] Patent Number: 5,894,553
[45] Date of Patent: Apr. 13, 1999

[54] SYSTEM FOR REPRODUCING CONTENTS OF WORK OPERABLE IN DIGEST REPRODUCING MODE BY DIGESTING PORTION CORRESPONDING TO THE TIME INTERVAL BETWEEN TWO EVENT MESSAGES STORED IN MEMORY

[75] Inventors: Takeshi Kawazome, Utsunomiya; Tsuneyoshi Takagi, Yokohama; Kenichiro Tanaka, Kawasaki, all of Japan

[73] Assignee: Canon Kabushiki Kaisha, Tokyo, Japan

[21] Appl. No.: 08/563,957

[22] Filed: Nov. 29, 1995

[30] Foreign Application Priority Data

Nov. 30, 1994 [JP] Japan .................................. 6-321343
Nov. 30, 1994 [JP] Japan .................................. 6-321349

[51] Int. Cl.$^6$ .................................................. G06F 13/00
[52] U.S. Cl. ............................ 395/200.33; 395/200.31
[58] Field of Search ........................ 395/200.38, 712, 395/200.56, 200.33, 200.31; 345/326, 340; 707/202, 201

[56] References Cited

U.S. PATENT DOCUMENTS

| 4,851,988 | 7/1989 | Trottier et al. | 395/200.56 |
| 5,204,936 | 4/1993 | Kaneko et al. | 706/10 |
| 5,315,711 | 5/1994 | Barone et al. | 395/200.38 |
| 5,434,994 | 7/1995 | Shaheen et al. | 707/201 |
| 5,564,005 | 10/1996 | Weber et al. | 345/326 |
| 5,590,347 | 12/1996 | D'Souza et al. | 395/712 |
| 5,596,702 | 1/1997 | Stucka et al. | 345/340 |
| 5,613,113 | 3/1997 | Goldring | 707/202 |

*Primary Examiner*—Thomas C. Lee
*Assistant Examiner*—David Ton
*Attorney, Agent, or Firm*—Fitzpatrick, Cella, Harper & Scinto

[57] ABSTRACT

There is provided an information processing apparatus in which an efficiency of a work that is being executed by a client application during the activation at present doesn't deteriorate, a recording process for recording the contents of the work so that they can be smoothly reconstructed can be executed, and a reproducing process which corresponds to the recording process and is provided to reconstruct the work contents can be efficiently executed. In the recording process, an event message which is generated by an input of the user is recorded into an event message memory. In the reproducing process, the event message is read out from the event message memory, the event message is stored into a transmission message buffer through a reproduction message buffer, and the event message is transmitted from the transmission message buffer to a client application.

18 Claims, 24 Drawing Sheets

| EXECUTION MODE NO | RECORD/ REPRODUCTION | EXECUTION MODE |
|---|---|---|
| 0 | RECORD | NORMAL RECORDING |
| 1 | RECORD | INDEX FLAG ON |
| 2 | REPRODUCTION | HALT |
| 3 | REPRODUCTION | NORMAL REPRODUCTION (WITHOUT TIME ADJUSTMENT) |
| 4 | REPRODUCTION | SKIP REPRODUCTION |
| 5 | REPRODUCTION | 1 EVENT REPRODUCTION |
| 6 | REPRODUCTION | REPRODUCTION (WITH TIME ADJUSTMENT) |
| 7 | REPRODUCTION | DIGEST REPRODUCTION |

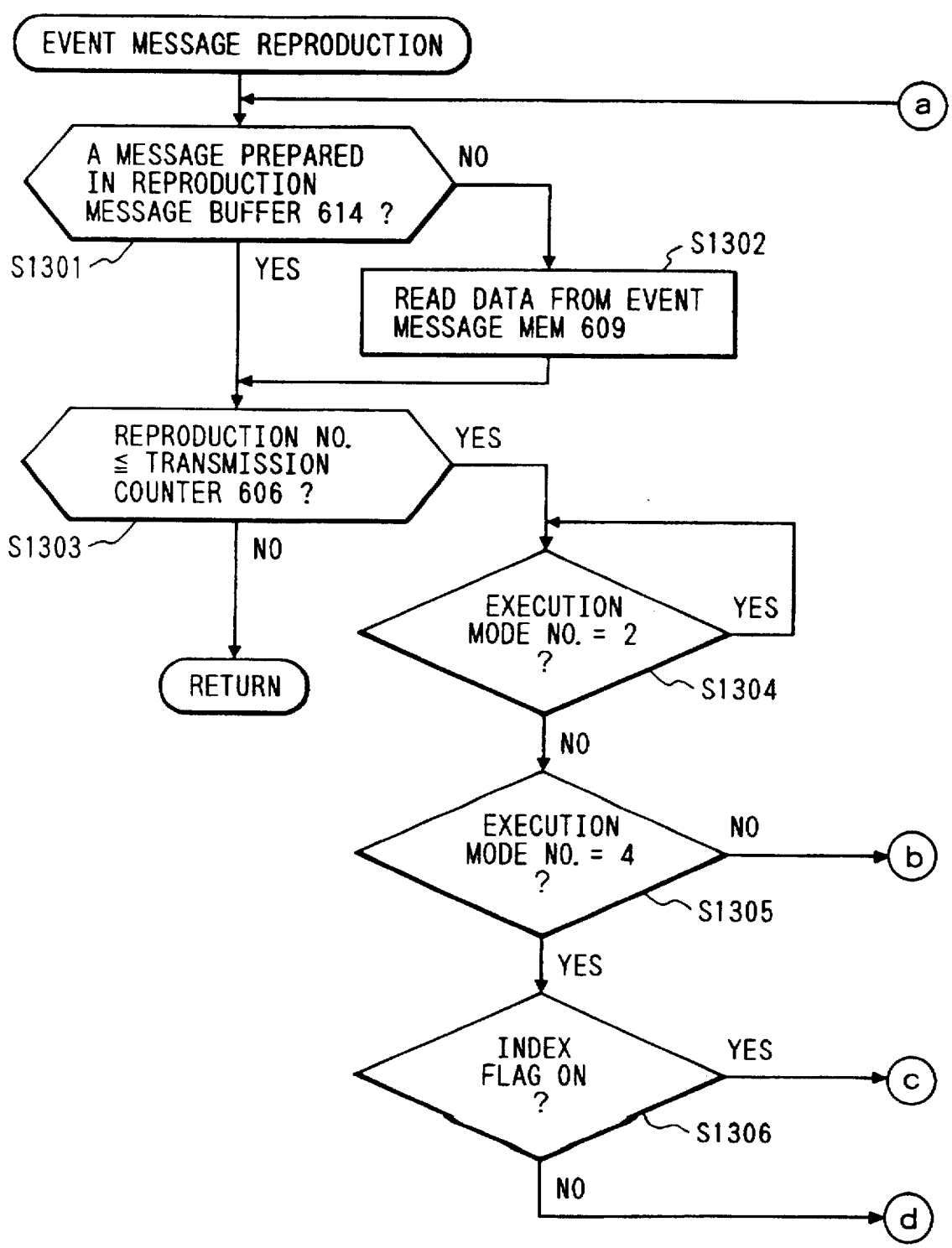

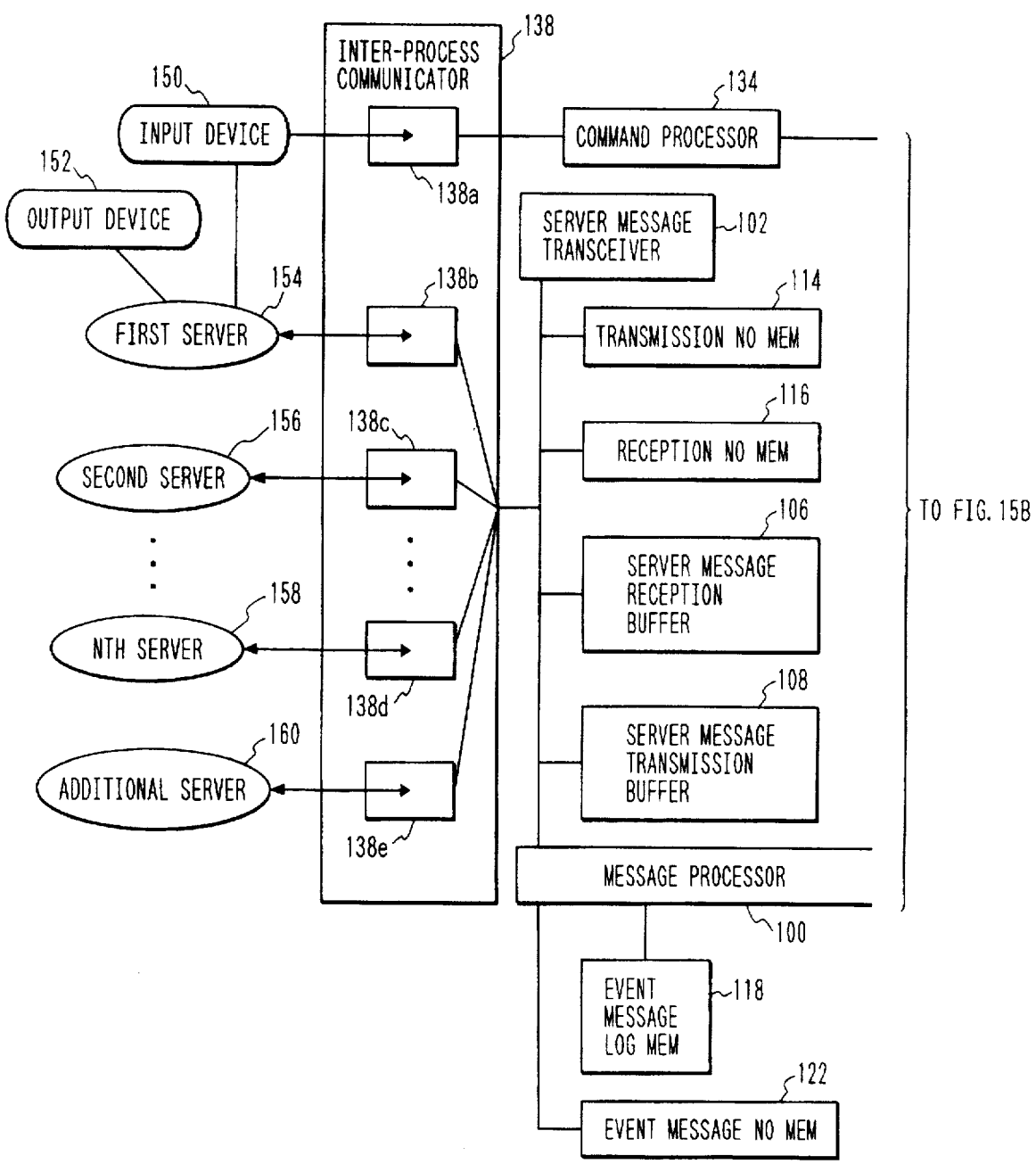

| RESOURCE ID 1 | SERVER 1 | SERVER 2 | · · · | SERVER n | ADDITIONAL SERVER |
|---|---|---|---|---|---|
| RESOURCE ID 2 | | | | | |
| ⋮ | | | | | |
| RESOURCE ID m | | | | | |
| ⋮ | | | | | |

SYSTEM FOR REPRODUCING CONTENTS OF WORK OPERABLE IN DIGEST REPRODUCING MODE BY DIGESTING PORTION CORRESPONDING TO THE TIME INTERVAL BETWEEN TWO EVENT MESSAGES STORED IN MEMORY

BACKGROUND OF THE INVENTION

1. Field of the Invention

The invention relates to an information processing apparatus and method and an information processing system which are used for an information processing apparatus such as a personal computer, workstation, or the like having a window system of a server client type, wherein the contents of work which is executed on a window opened on a display are recorded so that they can be reconstructed and the recorded work contents are reconstructed.

2. Related Background Art

In a conventional window system of the server client type, by communicating messages among an input device, such as keyboard mouse, or the like, a window system server for managing a display such as a CRT, liquid crystal display, or the like, and an activated client application, the user can execute a work using the client application while watching the window opened on the display.

In the server client type window system, it is desired that the contents of work which is executed on the open window by the client application are reconstructed later without improving the existing window server and client application of the system.

To realize the above method, there is considered a method whereby a window in which the work contents have been drawn is recorded as bit map data at any desired time during the work or, in the case of work in an application which has a saving/loading function, there is also a method whereby the work contents are preserved at any time during the work by changing file names. According to these methods, the contents of the work which is executed on the open window by the client application can be recorded so that the work can be reconstructed, without improving the existing window server and client application of the system.

However, according to the former method of recording the window during the work as bit map data, in order to reconstruct the work as if a video image were reproduced, each time a drawing state of the window changes, it is necessary to preserve the new set of bit map data. Consequently, an extremely large memory capacity is necessary, the load on the processing for recording the bit map data increases, and the processing of the work itself in the client application is delayed. Those drawbacks cause deterioration in working efficiency.

As for the reproduction of the work, although the work contents can be seen as a bit map image, the work cannot be continued after completion of the reproduction.

On the other hand, according to the latter method of preserving the work contents by changing the file name during the work at any desired time, although the work can be continued after completion of the reproduction, it can be realized only by that application to reconstruct the work saving/loading function has. To reconstruct the work as if a video image were reproduced, each time the drawing state of the window changes, it is necessary to preserve the file. Therefore, an extremely large memory capacity is necessary, the load on the processing for preserving increases, and the processing of the work itself in the application is delayed. Those drawbacks cause deterioration in working efficiency.

Further, since it is necessary to read out a number of files continuously in the reproducing mode, it is very difficult to execute the reproduction smoothly.

It is an object of the invention to provide an information processing apparatus and method, in which the efficiency with which work is executed in a client application during the activation doesn't deteriorate, a recording process to record the work contents so that they can be smoothly reconstructed can be executed, and a reproducing process which corresponds to the recording process and is necessary to reconstruct the work contents can be efficiently executed.

Another object of the invention is to provide an information processing apparatus and method, in which the efficiency with which work which is being executed in a client application during the activation at present doesn't deteriorate, and a recording process to record the work contents so that they can be smoothly reconstructed can be executed.

A halfway participating process of a new user during the execution of a cooperating work using the conventional window shared system is realized by interrupting the work of the user which has participated so far, saving the work contents at that time point, finishing the client application, making the client operative under an environment including the new user after that, and loading (reading) the saved contents.

In the above conventional apparatus, however, using such halfway participating process, the relatively high costs of saving and then reloading the state of the client means that the work efficiency is deteriorated. Further, there is a problem in the requirement that the user must designate a file to preserve the state of the client because of the operation of the halfway participation and the operation for this purpose is troublesome.

The invention is made in consideration of the above problems of the conventional techniques and it is an object of the invention to provide an information processing system in which a working efficiency and an operability when executing a participating process in the middle are improved.

SUMMARY OF THE INVENTION

According to an embodiment of the invention, there is provided an information processing apparatus for reproducing the contents of a work which is executed on an open window by a window system of the server client type, having a memory that stores an event message generated by user input, and also stores the time of generation of the message, in correspondence with the message itself. The system also has means for generating the stored event message, based on the generation-time information, and means for reproducing the contents of work executed on the window previously, on the basis of the event message.

The above and other objects and features of the present invention will become apparent from the following detailed description and the appended claims with reference to the accompanying drawings.

DETAILED DESCRIPTION OF THE PREFERRED EMBODIMENTS

[First embodiment]

An embodiment of the invention will now be described hereinbelow with reference to the drawings.

Figure 1:
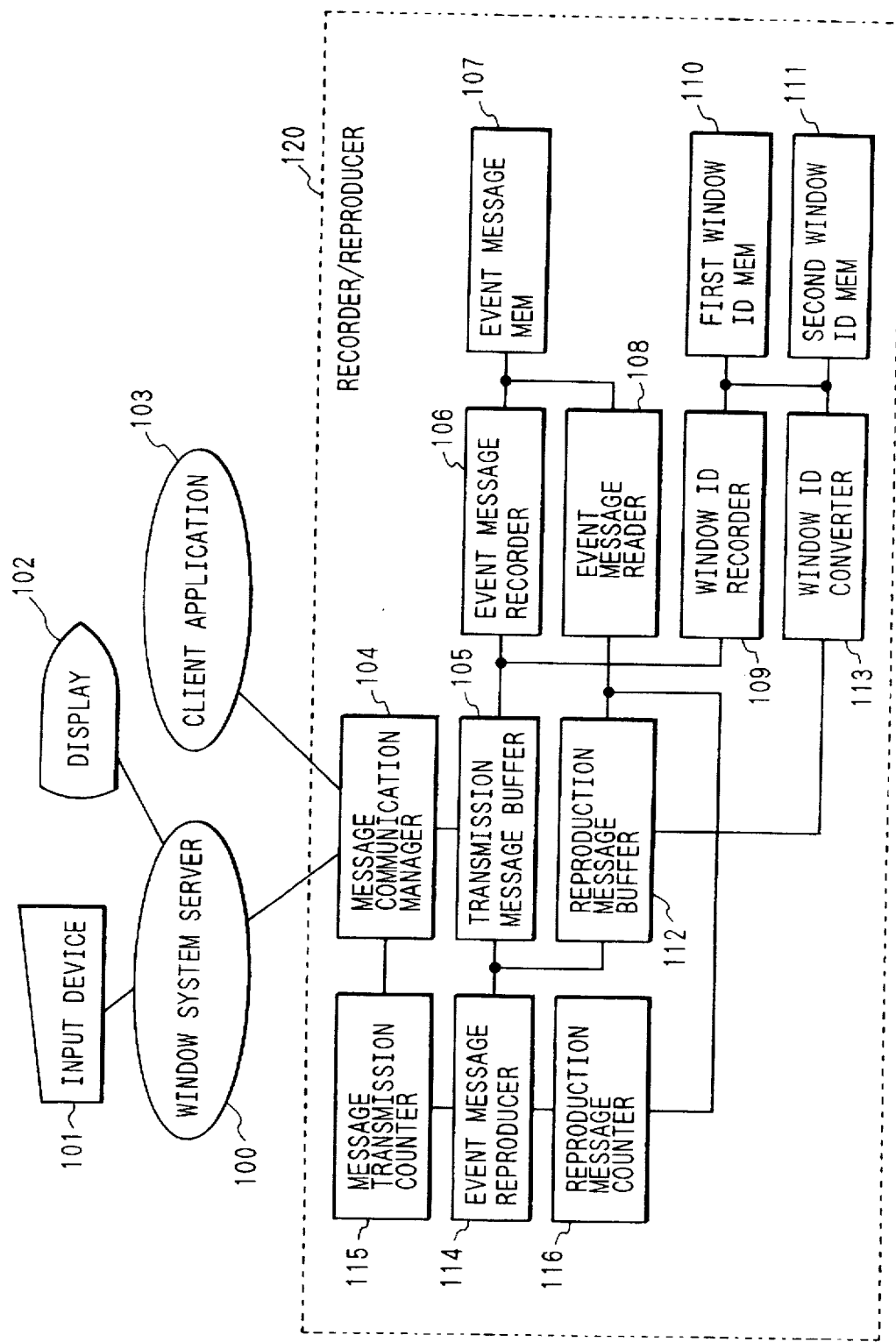
FIG. 1 is a block diagram showing a construction of the first embodiment of recorder/reproducer of the invention.
Figure 5:
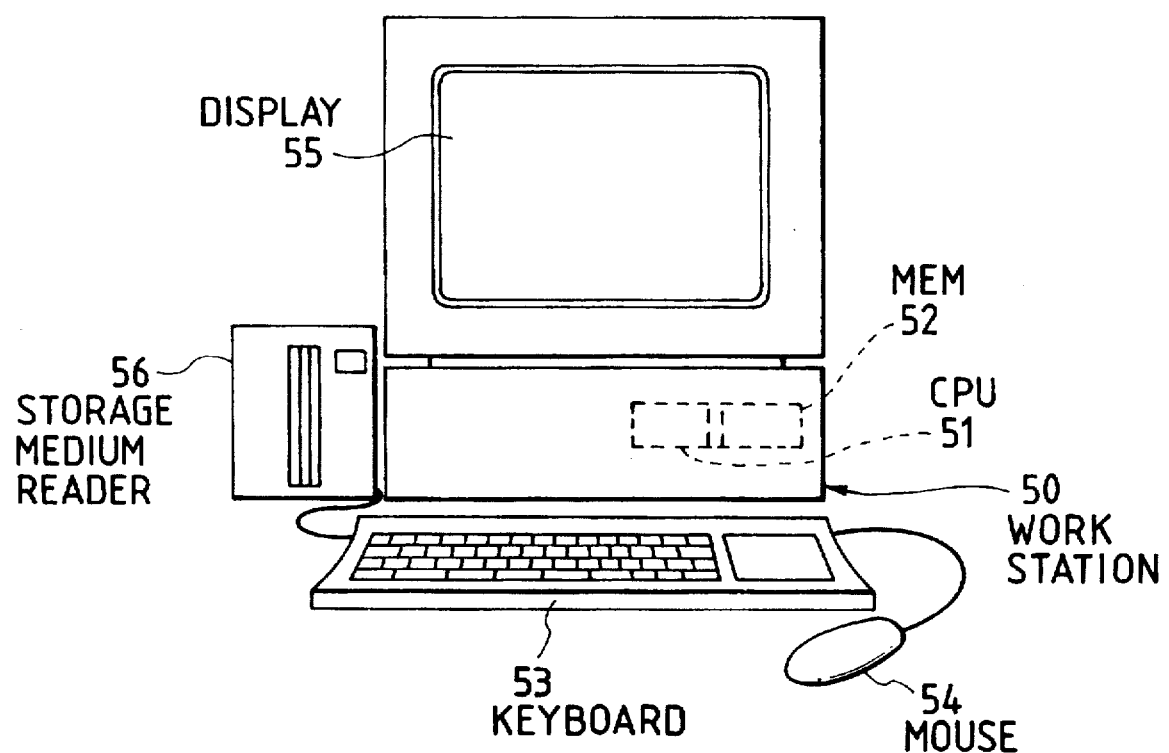
FIG. 5 is a hardware constructional diagram of the recorder in FIG. 1.

FIG. 1 is a block diagram showing a construction of the first embodiment of a recorder/reproducer of the present invention. FIG. 5 is a hardware constructional diagram of the recorder/reproducer in FIG. 1.

Recording and reproducing processes will now be described with reference to FIG. 1.

In a window system of the server client type, as shown in FIG. 1, an operation is executed by communicating a message between a window system server 100 and a client application 103. For example, in the case where the window system server 100 is an X window system, the message denotes an X protocol.

The window system server 100 manages an input device 101 such as a keyboard, mouse, or the like and a display 102 such as a CRT, liquid crystal display (LCD), or the like. The user inputs using the input device 101 in an interactive manner while observing the display 102 through the window system server 100.

A recorder/reproducer 120 operates between the client application 103, as a target, work in which is to be recorded or reproduced, and the window system server 100. An application client which is not such a target directly transmits and receives messages to/from the window system server 100.

The recorder/reproducer 120 has a message communication manager 104 for relaying the message which is transmitted and received between the window system server 100 and the client application 103 while storing such messages into a transmission message buffer 105, and for increasing a count value of a message transmission counter 115 each time a message is transmitted.

When the message stored in the transmission message buffer 105 is an event message which is generated by the input of the user, the message, the count value of the message transmission counter 115, time, equal to the interval between a reference time and the time at which the message is stored in the transmission message buffer 105, are recorded into an event message memory 107 by an event message recorder 106. The term event which is generated by the input of the user" denotes an event that is generated by a key operation in the input device 101, an event that is generated by a button operation of the mouse, or the like. Since the message which is recorded in the event message memory 107 is an event message which is generated by the input of the user, the message that is recorded in the event message memory 107 is called an event message.

Window ID information (hereinafter, referred to as a window ID) included in the message stored in the transmission message buffer 105 is derived from the message by a window ID recorder 109. When the window ID so derived is one ID obtained from the message in the recording mode, the obtained window ID is recorded into a first window ID memory 110. When the window ID derived is one obtained from the message in the reproducing mode, the obtained window ID is recorded into a second window ID memory 111.

The event messages recorded in the event message memory 107 are sequentially read out by an event message reader 108. The event message reader 108 stores the read-out event messages into a reproduction message buffer 112. The count value of the message transmission counter recorded in the event message memory 107 is stored into a reproduction message counter 116.

A portion of the window ID in the event message stored in the reproduction message buffer 112 is retrieved from the first window ID memory 110 by the window ID converter 113 and is extracted. The extracted window ID is converted to the corresponding window ID in the second window ID memory 111.

When the count value of the message transmission counter 115 is smaller than the count value of the reproduction message counter 116 by "1", the event message in the reproduction message buffer 112 is stored into the transmission message buffer 105 by an event message reproducer 114. The event message stored in the transmission message buffer 105 is transmitted to the client application 103 by the message communication manager 104. In association with the transmission of the event message, the count value of the message transmission counter 115 is increased by "1".

The recorder/reproducer of the embodiment can be implemented in a workstation as shown in FIG. 5.

A workstation main body 50 has therein: a memory device 52 for storing control programs including a program to execute the window system of the server client type, a program to execute the window recording and reproducing processes, and the like and various kinds of data; and a CPU 51 to execute an arithmetic operation and a process on the basis of the control program stored in the memory device 52. A keyboard 53 and a mouse 54 as input devices, a display 55 to display the results of arithmetic operations and processing, and a storage medium reader 58 to read a program, data, etc., written in a storage medium such as a floppy disk, CD-ROM, or the like from the storage medium are connected to the workstation main body 50. The storage medium reader 56 is connected as necessary.

The recording and reproducing operations in the embodiment will now be described with reference to the drawings.

Figure 2:
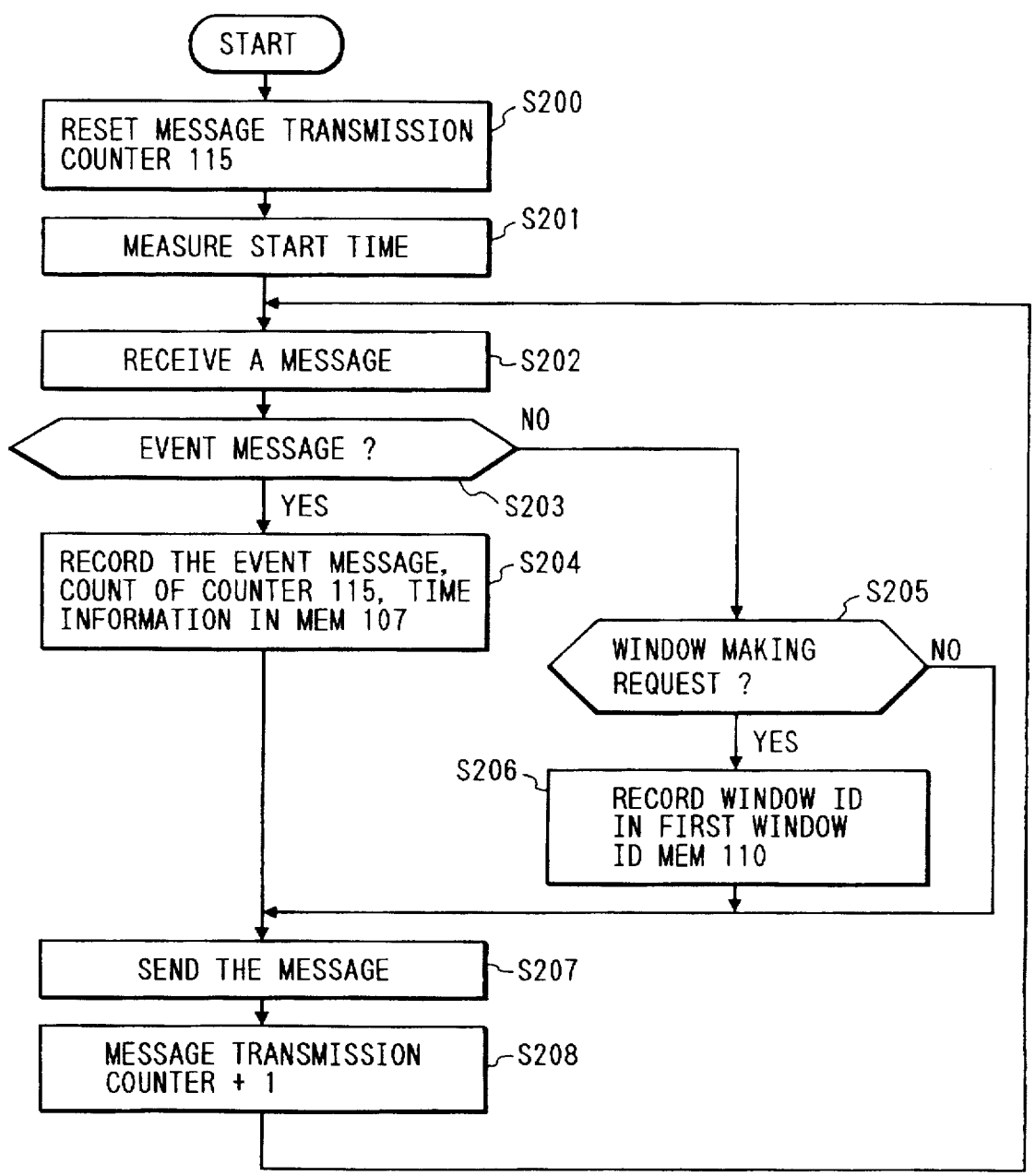
FIG. 2 is a flowchart showing a recording processing operation which is executed by the recorder/reproducer of FIG. 1.

The recording operation will now be described with reference to FIG. 2 and the block diagram of FIG. 1. FIG. 2 is a flowchart showing the recording operation which is executed by the recorder/reproducer in FIG. 1.

When the system is started, as shown in FIG. 2, the message transmission counter 115 is first reset (step S200). A start time is measured by the system by a CPU time (step S201). In this embodiment, although the start time is measured by a system time by the CPU, in place of that, the start time can be also measured by an absolute time. By measuring the start time by the absolute time, the user can accurately reconstruct the work contents with respect to a designated time.

Subsequently, when the message communication manager 104 is connected to the window system server 100 and the client application 103 and receives the message that is transmitted and received between the window system server 100 and the client application 103, the message is stored into the transmission message buffer 105 (step S202).

A check is made to see if the message stored in the transmission message buffer 105 is an event message (for example, in case of the X window system, KeyPress event message, ButtonPress event message, etc.) which is generated by the input of the user or not (step S203).

When the message stored in the transmission message buffer 105 is an event message that is generated by the input of the user, the message, the count value of the message transmission counter 115, and the time information indicative of the relative time from the reference time to the time at which the message is stored in the transmission message buffer 105 are sequentially recorded into the event message memory 107 (step S204).

Subsequently, the message stored in the transmission message buffer 105 is transmitted to the partner side (step S207). The count value of the message transmission counter 115 is increased by "1" (step S208). After the count value of the message transmission counter 115 was increased, the processing routine is returned to step S202 and the next message is received.

When the message stored in the transmission message buffer 105 is not an event message generated by input of the user (step S203), a check is made to see if the message stored in the transmission message buffer 105 is a window making request to request the window system server 100 so that the client application 103 can define and use a newly-made window (step S205).

When the message stored in the transmission message buffer 105 is a window making request from the client application 103 to the window system server 100. The window ID of the window which is formed by the message is recorded into the first window ID memory 110 by the window ID recorder 109 (step S206). In this recording process, the window IDs to be recorded into the first window ID memory 110 are sequentially recorded so as to be arranged in accordance with the order of the windows in which the making was requested by the client application 103, namely, the order of the windows which are actually opened.

Subsequently, steps S207 and S208 are sequentially executed and the processing routine is returned to step S202.

When the message stored in the transmission message buffer 105 is not a window making request from the client application 103 to the window system server 100, the processing routine advances to step S207 without executing the recording (step S206) of the window ID into the first window ID memory 110.

Figure 3:
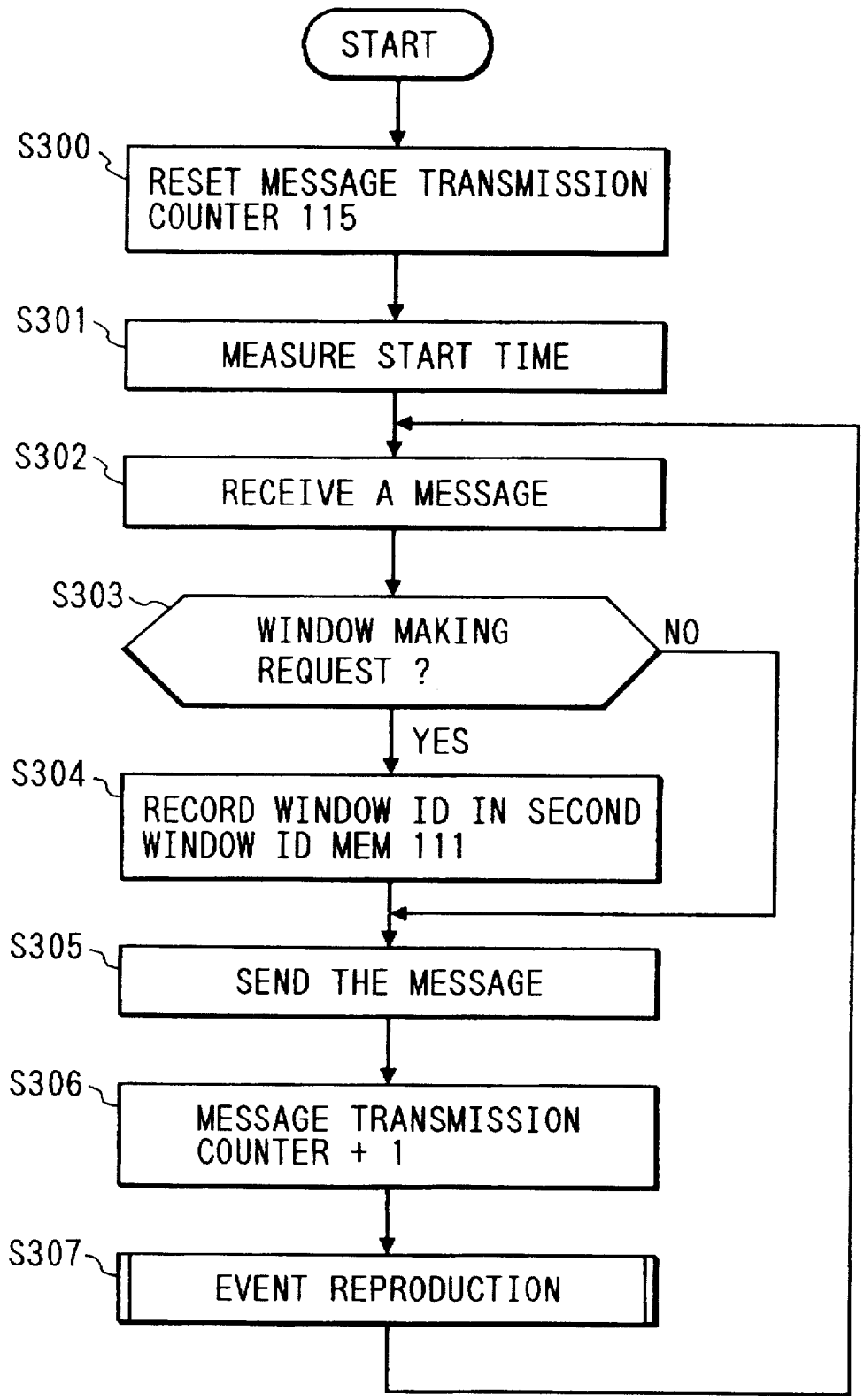
FIG. 3 is a flowchart showing a reproduction processing operation which is executed by the recorder/reproducer of FIG. 1.
Figure 4:
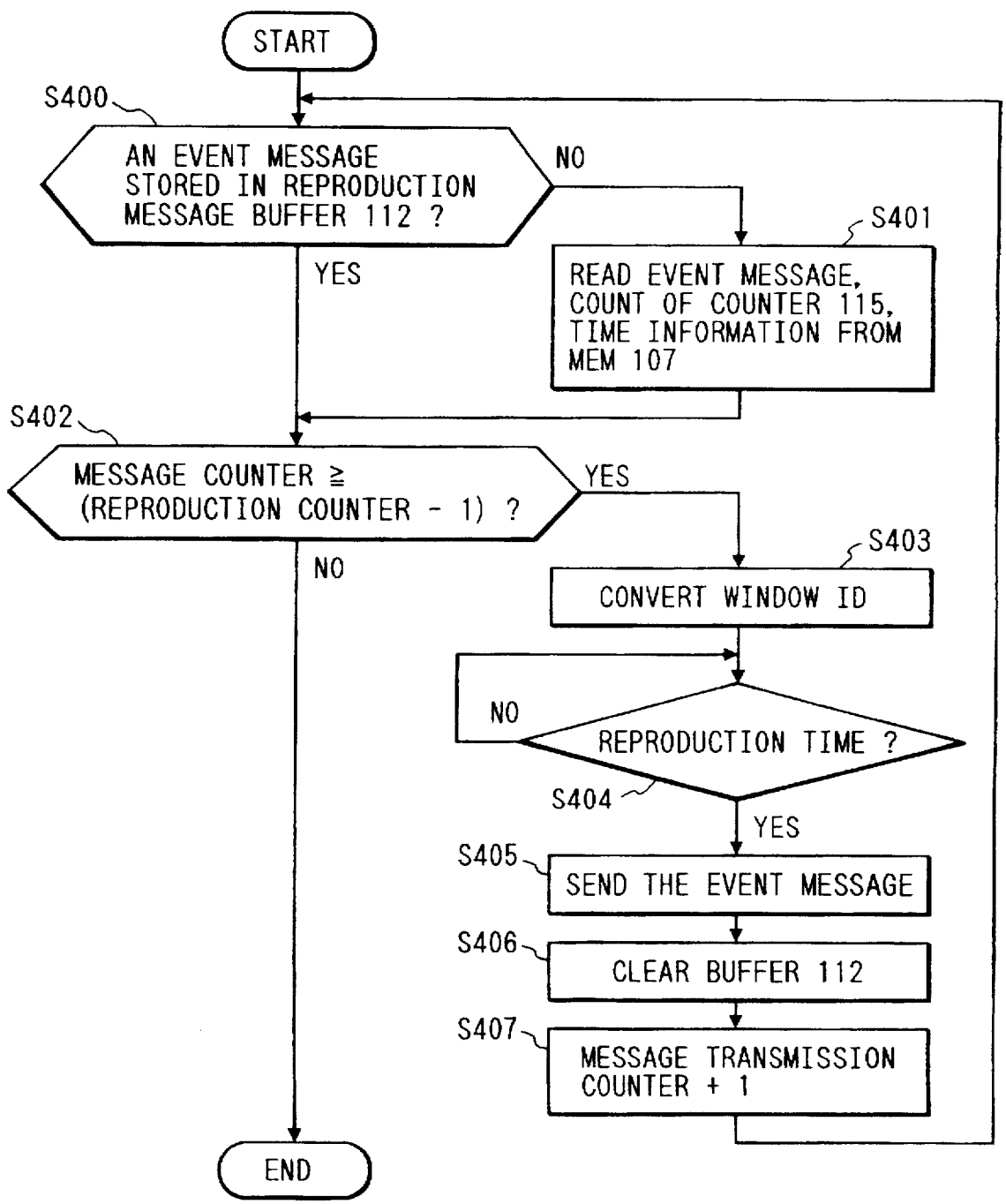
FIG. 4 is a flowchart showing a reproduction processing routine in FIG. 3.

The reproducing operation will now be described with reference to FIGS. 3 and 4. FIG. 3 is a flowchart showing the reproducing operation. FIG. 4 is a flowchart showing an event reproduction processing routine in step S307 in FIG. 3.

In the reproducing operation, a message managing process performed by the message communication manager 104 and a message reproducing process are executed. Specifically speaking, in a manner similar to the recording mode, the message communication manager 104 connects the window system server 100 and the client application 103 and relays the message that is transmitted and received therebetween. However, in the message reproducing mode, for the event message from the window system server 100 which is generated on the basis of the input from the input device 101 by the user, the event message is abandoned without being stored into the transmission message buffer 105. In place of it, the event message reproduced by the event message reproducer 114 is transmitted to the client application 103 as if generated by the user input. Namely, the input performed by the user in the recording mode is reproduced, and the work contents are reconstructed on the basis of the reproduced input.

First, when the system is started, as shown in FIG. 3, the message transmission counter 115 is reset (step S300) in a manner similar to the case in the recording mode, and the start time is measured (step S301).

When the message communication manager 104 is connected to the window system server 100 and the client application 103 and receives the message that is transmitted and received between the window system server 100 and the client application 103, the message is stored in the transmission message buffer 105 (step S302).

Subsequently, a check is made to see if the message stored in the transmission message buffer 105 is a window making request from the client application 103 to the window system server 100 or not (step S303).

When the message stored in the transmission message buffer 105 is such a window making request, the window ID of the window made by the message is recorded into the second window ID memory 111 by the window ID recorder 109 (step S304). The window ID into the second window ID memory 111, the window IDs to be recorded into the second window ID memory 111 are sequentially recorded so as to be arranged in accordance with the order of the windows in which the making was requested by the client application 103, namely, the order of the windows which are actually opened.

The message stored in the transmission message buffer 105 is subsequently transmitted to the partner side (step S305), and the count value of the message transmission counter 115 is increased by "1" (step S306).

After the count value of the message transmission; counter 115 has been increased, an event reproducing routine is executed (step S307).

After the event reproducing routine was executed, the processing routine is returned to step S302, and the next message is received.

The event reproducing routine will now be described with reference to FIG. 4.

When the event reproducing routine is started, as shown in FIG. 4, a check is first made to see if the message has been stored in the reproduction message buffer 112 or not (step S400).

When the message is not stored in the reproduction message buffer 112, the event message recorded in the event message memory 107, time information, and count value of the message transmission counter 115 are read out. The event message and time information to be read out are stored into the reproduction message buffer 112, and the count value of the message transmission counter 115 is stored in the reproduction message counter 116 (step S401).

When the message has been stored in the reproduction message buffer 112, or once the event message recorded in the event message memory 107, time information, and count value of the message transmission counter 115 have been stored, the count value of the reproduction message counter 116 is compared with the current count value of the message transmission counter 115. A check is made to see if the count value of the message transmission counter 115 is equal to or larger than the value obtained by subtracting "1" from the count value of the reproduction message counter 116 or not (step S402).

When the count value of the message transmission counter is equal to or larger than (the count value of the reproduction message counter 116-1), the window ID included in the event message in the reproduction message buffer 112 is converted by the window ID converter 113 (step S403). In the conversion of the window ID, the window IDs in the recording mode of the event message are sequentially recorded into the first window ID memory 110 in accordance with the making order of the windows. The window IDs of the windows formed for a time interval from the start time point of the reproducing process to the present time point are sequentially recorded in the second window ID memory 111 in accordance with the making order of the windows. Therefore, the window ID converter 113 retrieves whether the window ID in the event message in the reproduction message buffer 112 has been recorded at which number in the first window ID memory 110, extracts the window ID in the second window ID memory 111 corresponding to the retrieved number, and converts into the window in which the window ID of the event message in the reproduction message buffer 112 was extracted.

Subsequently, the time information (relative time in the recording process) corresponding to the event message in the reproduction message buffer 112 is compared with the relative time from the reference time at the current time point, and the apparatus waits until the time interval from the reference time to the current time point coincides with the time information corresponding to the event message in the reproduction message buffer 112 (step S404).

When the time relative interval, or time, from the reference time at the current time point coincides with the time information corresponding to the event message in the reproduction message buffer 112, the event message in the reproduction message buffer 112 is stored into the transmission message buffer 105. The stored event message is transmitted to the client application 103 by the message communication manager 104.

After the event message has been transmitted, the data stored in the reproduction message buffer 112 is cleared (step S406). The count value of the message transmission counter 115 is increased by "1" (step S407), and the processing transmission counter 115 was increased, the processing routine is again returned to step S400.

By the above processing routine, the amount of data that must be handled in association with the recording of the contents of the work which is executed by the client application 103 can be reduced. The recording process to record the work contents so that they can be reconstructed can be executed without deteriorating the working efficiency by the client application during the activation at present. In the reproducing mode of the work, an efficiency of the process to reproduce the work can be raised. Since the event message and time information have been recorded, the work contents can be reconstructed with high fidelity.

In the embodiment, although the event message and the window ID are respectively recorded into the event message memory 107 and the first and second window ID memories 110 and 111, the event message and window ID can be also recorded as files in an external memory device, respectively.

[Second embodiment]

Figure 6:
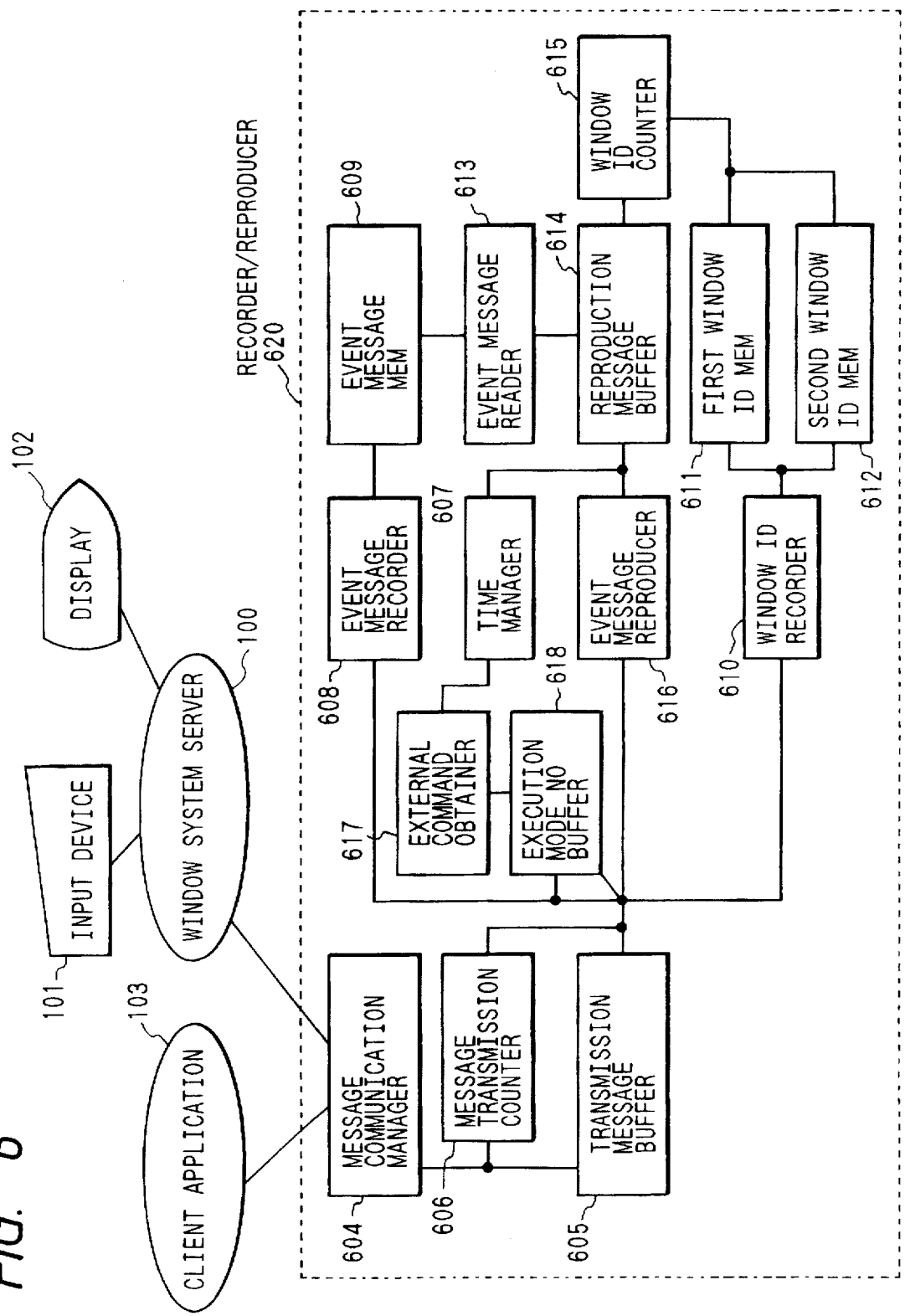
FIG. 6 is a block diagram showing a construction of the second embodiment of recorder/reproducer of the invention.
Figures 7, 8:
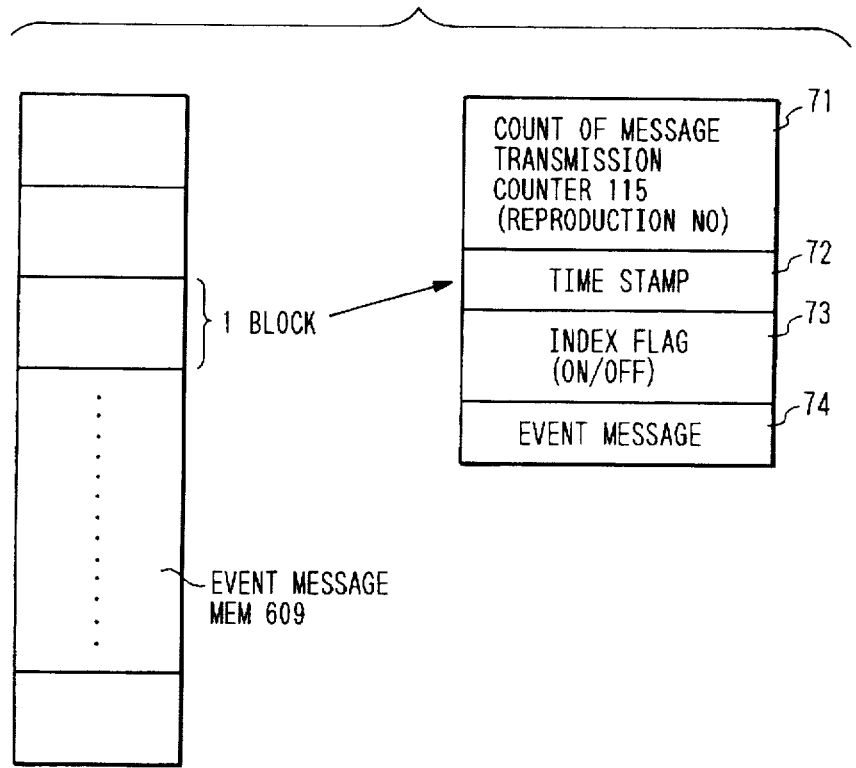
FIG. 7 is a diagram showing a recording form of data in an event message memory in FIG. 6.
FIG. 8 is a diagram showing a correspondence table between the execution mode No. and the execution mode.
Figure 9:
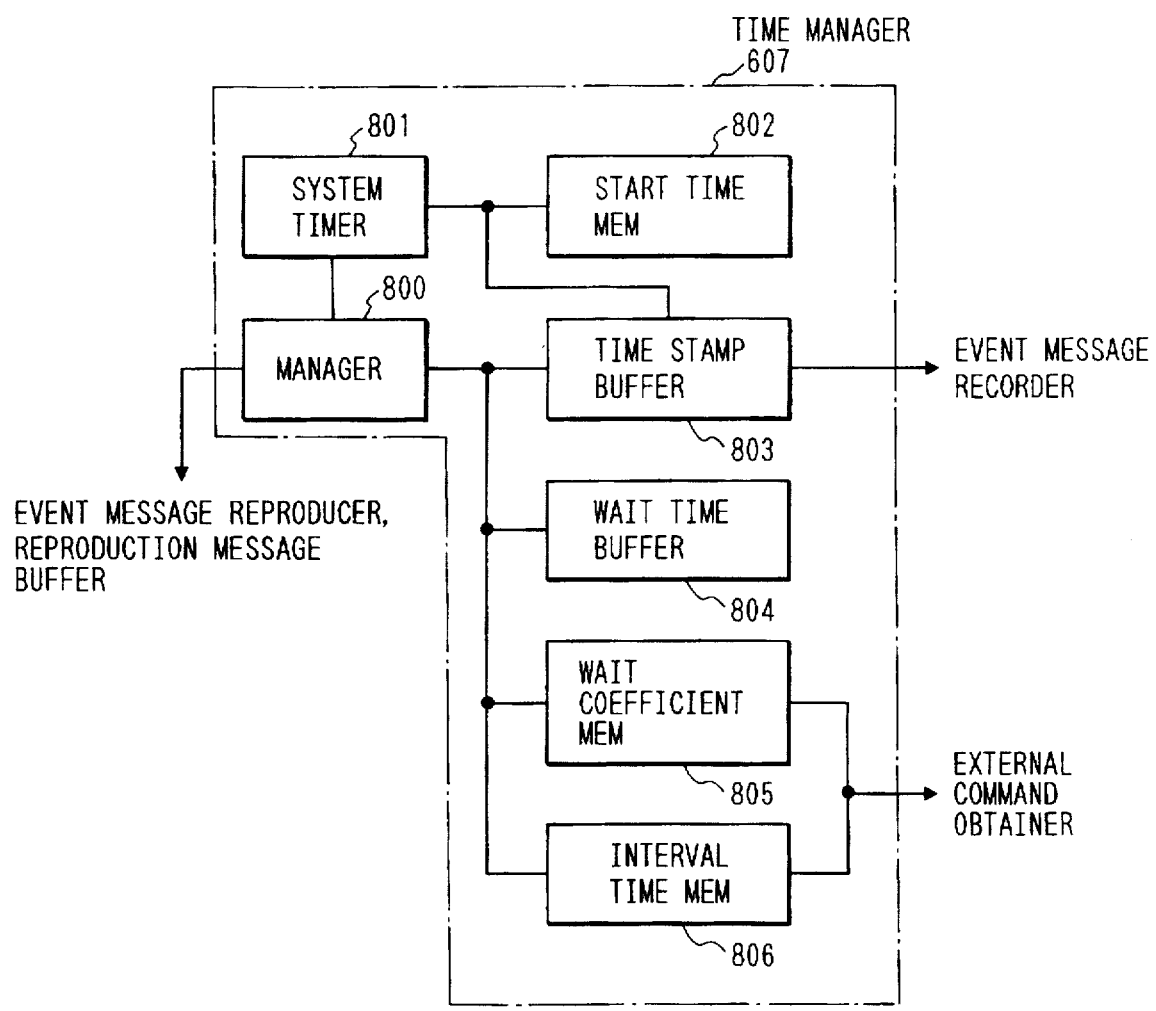
FIG. 9 is a block diagram showing a construction of time manager in FIG. 6.

The second embodiment of the invention will now be described with reference to the drawings. FIG. 6 is a block diagram showing a construction of the second embodiment of a recorder/reproducer of the invention. FIG. 7 is a diagram showing a recording format of data in the event message memory in FIG. 6. FIG. 8 is a diagram showing a correspondence table relating the execution mode number and the execution mode. FIG. 9 is a block diagram showing a construction of the time manager in FIG. 6.

As shown in FIG. 6, the window system of the server client type operates by communicating a message between the window system server 100 for managing the input device 101 and display 102 and the client application 103. The user inputs using the input device 101 through the window system server 100 in an interactive manner while watching the display 102.

A recorder/reproducer 620 is used as means for recording the contents of the work that is executed on the window system of the server client type so that they can be reconstructed.

The recorder/reproducer 620 has a message communication manager 604. The message communication manager 604 relays the message which is transmitted and received between the window system server 100 and the client application 103 while storing into a transmission message buffer 605. The manager 604 also increases a count value of a message transmission counter 606 each time one message is transmitted to the partner side.

A time management for the transmission and reception of the message between the window system server 100 and the client application 103 is executed by a time manager 607, which is explained hereinbelow.

When the message stored in the transmission message buffer 605 is an event message that is generated by the input of the user, the message, the count value of the message transmission counter 606, and the relative time (hereinafter, referred to as a time stamp) from the reference time to the time at which the message is stored in the transmission message buffer 605 and which is derived from the time manager 607, and an index flag indicative of an execution mode number, which is explained hereinbelow, are recorded in an event message memory 609 by an event message recorder 608.

As for the recording format of the data in the event message memory 609, as shown in FIG. 7, with regard to one event message, a count value 71 of the message transmission counter 606, a time stamp 72, an index flag 73, and the contents of an event message 74 are set to one block and are recorded in accordance with the order by which they were stored in the transmission message buffer 605, namely, in accordance with the order of the count of the message transmission counter 606. When the event message to be recorded is received in a state in which the execution mode number is equal to "1", the index flag 73 is set to ON. When the event message to be recorded is received in a state in which the execution mode number is equal to "0", the index flag 73 is set to OFF.

When the message of the contents stored in the transmission message buffer 605 indicates a window making request message to request the window system server 100 to newly make a window, the window ID of the window to be newly formed that is included in the message is obtained by a window ID recorder 610. When the window ID so obtained is a window ID in the recording mode, the window ID is recorded into a first window ID memory 611. When the window ID so obtained is a window ID in the reproducing mode, the window ID is recorded into a second window ID memory 612.

The event message recorded in the event message memory 609, transmission count value, and the like are sequentially read out by an event message reader 613 and are stored into a reproduction message buffer 614.

The window ID of the event message stored in the reproduction message buffer 614 is converted to the window ID in the second window ID memory 612 corresponding to the window ID retrieved from the first window ID memory 611 by a window ID converter 615.

The event message stored in the reproduction message buffer 614 is stored into the transmission message buffer 605 by an event message reproducer 616 when the time to reproduce the message comes.

The execution mode number is determined by an external input command obtainer 617. The decided execution mode number is stored into an execution mode No. buffer 618. The external input command obtainer 617 obtains a command for reproduction stop, reproduction speed adjustment, or the like, which is inputted by the user and determines the value in the execution mode number buffer 618 on the basis of the command. As shown in FIG. 8, the execution mode is made correspond to the execution mode number. The recording process for the client application work is made correspond to the execution mode number "0" or "1". During the recording process of the work, when the user inputs a command such as to set the execution mode number to "1", the external input command obtainer 617 sets the execution mode number to "1". An index flag of the event message to be recorded at this time is set to ON. When the event message is recorded into the event message memory 609 in the ON state of the index flag, the execution mode number is returned to "0".

The content or definition of each reproducing process is made to correspond to a respective one of the execution mode number "2" to "7". A temporary stop of the reproduction corresponds to execution mode No. "2". A normal reproduction (without time adjustment) corresponds to "3". A skip reproduction is made correspond to "4". A 1-event reproduction corresponds to "5". A reproduction with time adjustment corresponds to "6". A digest reproduction corresponds to "7". When the skip reproduction is designated, a reproducing operation which is stopped after the high speed reproduction was performed until the event message at which the index flag of the event message is set to ON is executed. That is, the operation which skips to a scene in which the index flag is set to ON and stops is performed in the recording mode of the work. When the 1-event reproduction is designated, the reproducing operation which stops each time one recorded event is reproduced is executed. In the reproduction with time adjustment, the reproduction is executed at the same time interval as that in the recording mode and a reproducing speed is varied by the external input from the user. When the digest reproduction is designated, so long as a time interval between the event messages to be reproduced is long, the operation for reducing the time interval and reproducing is performed.

A construction of the time manager 607 will now be described with reference to FIG. 9.

As shown in FIG. 9, the time manager 607 has: a system timer 801; a start time memory 802; a time stamp buffer 803; a wait time buffer 804; a wait coefficient memory 805; an interval time memory 806; and a manager 800 to control and manage the system timer 801, each memory, and each buffer.

When there is a request to measure the start time, the system timer 801 records the current time into the start time memory 802. When there is a request to measure the time stamp, the current time is measured and the relative time from the start time to the current time is stored into the time stamp buffer 803.

A value of 0 or more is stored into the wait coefficient memory 805 and interval time memory 806 and can be changed by the external input from the user.

In a manner similar to the hardware construction of the first embodiment, a hardware of the second embodiment is constructed by one workstation and an explanation of its construction is omitted here.

Figure 10:
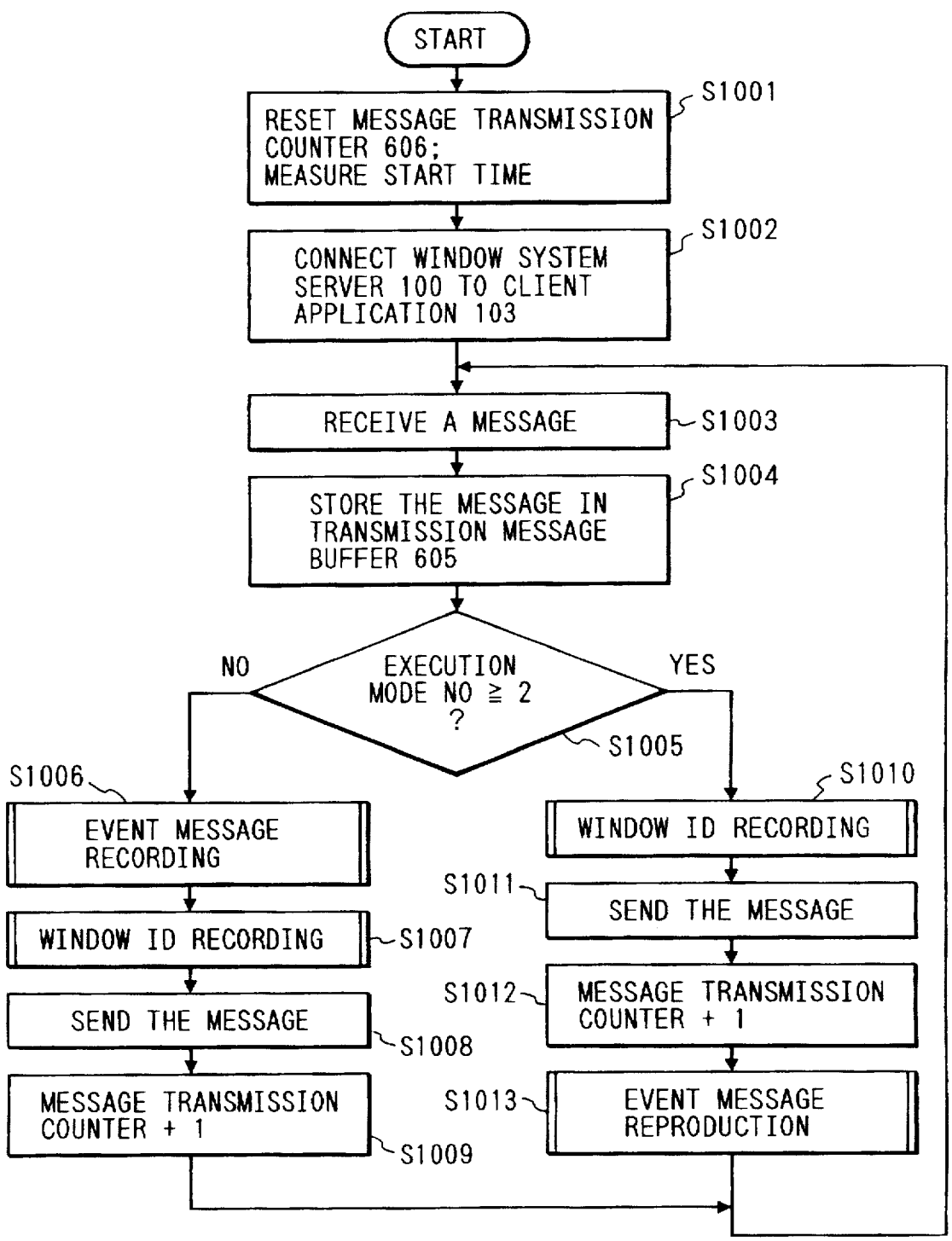
FIG. 10 is a flowchart showing the operation which is executed by the recorder/reproducer in FIG. 6.
Figure 11:
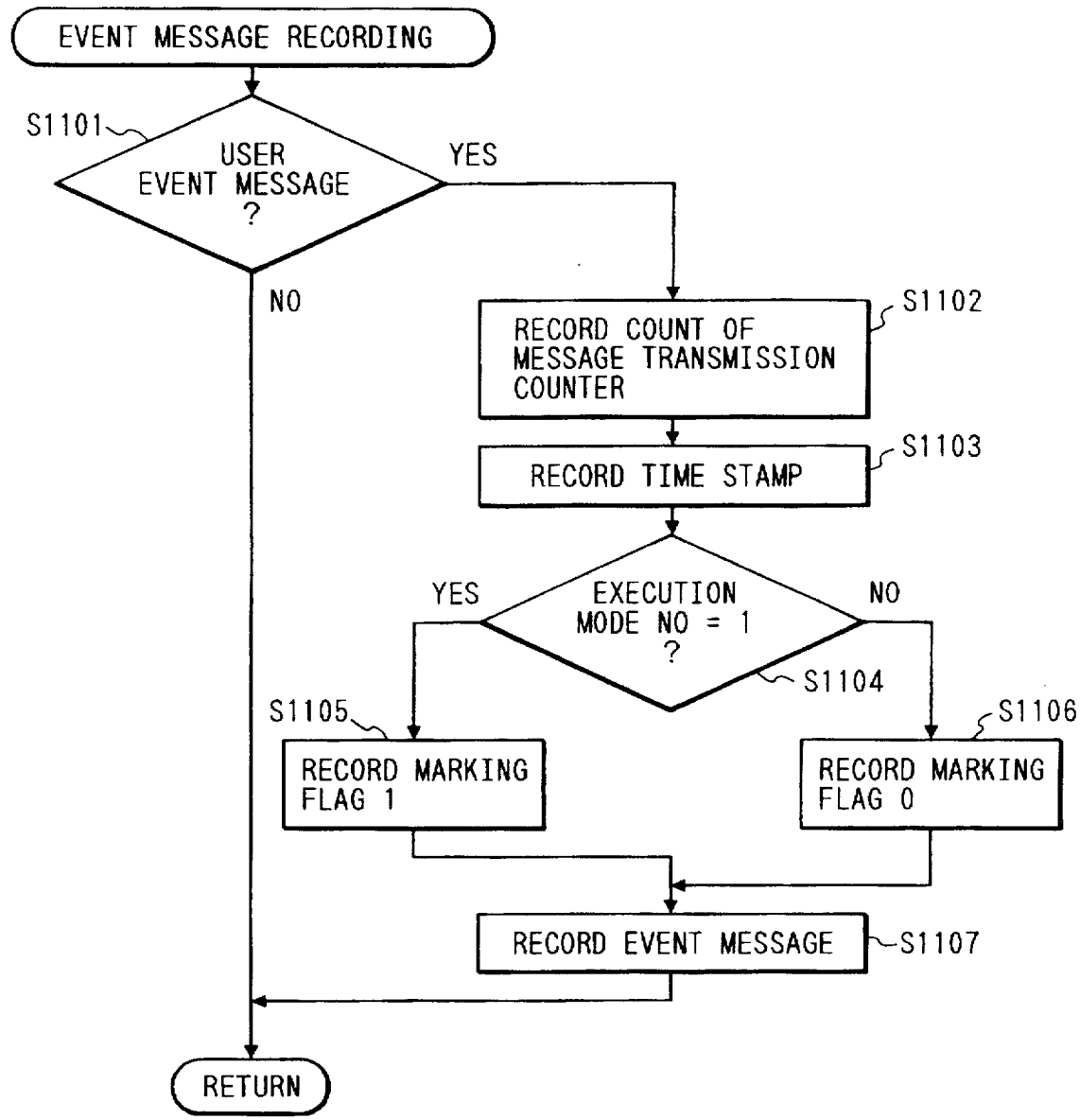
FIG. 11 is a flowchart showing the operation of an event message recording routine which is executed by an event message recorder.
Figure 12:
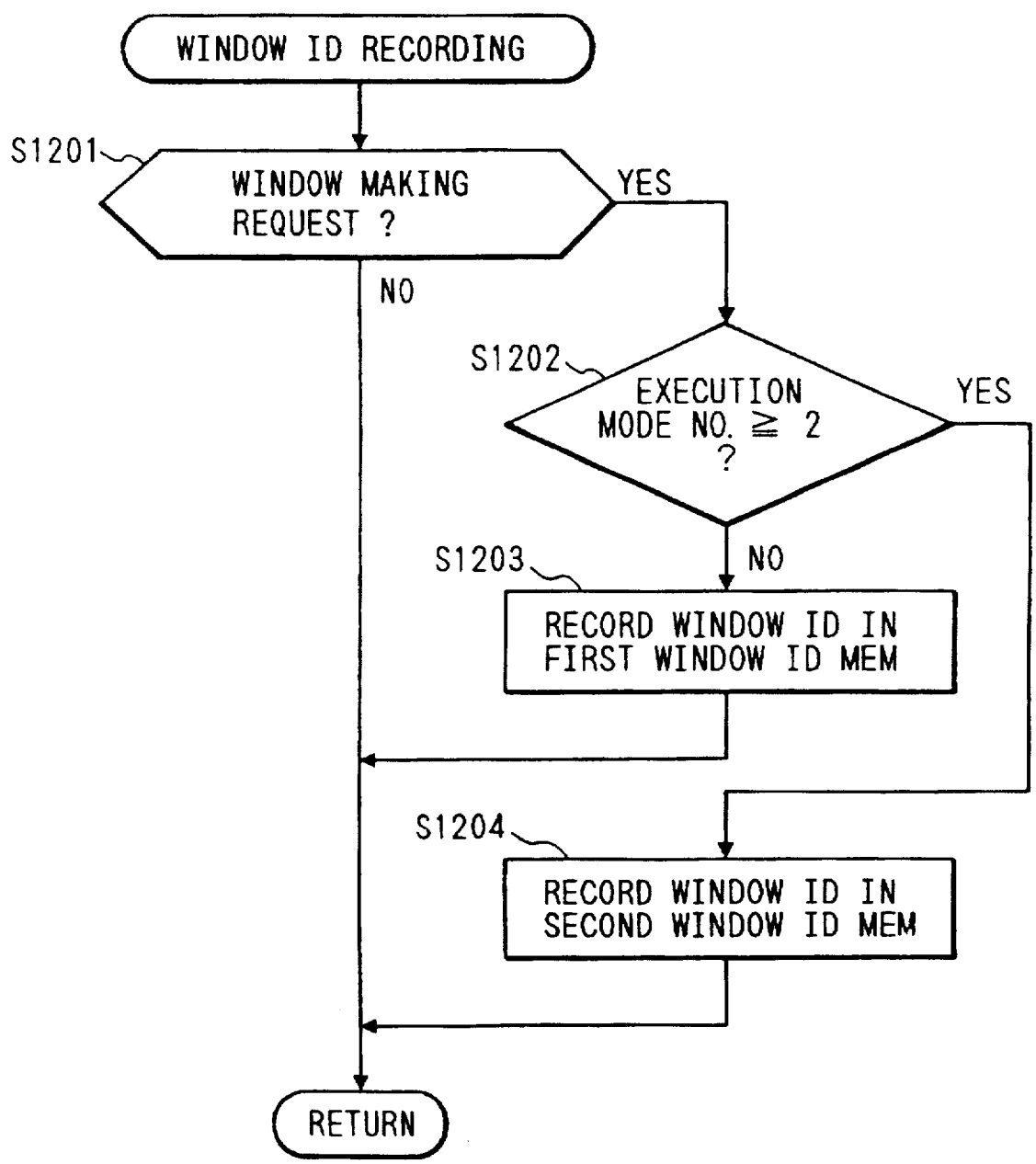
FIG. 12 is a flowchart showing the operation in a window ID recording routine which is executed by a window ID recorder.
Figure 13B:
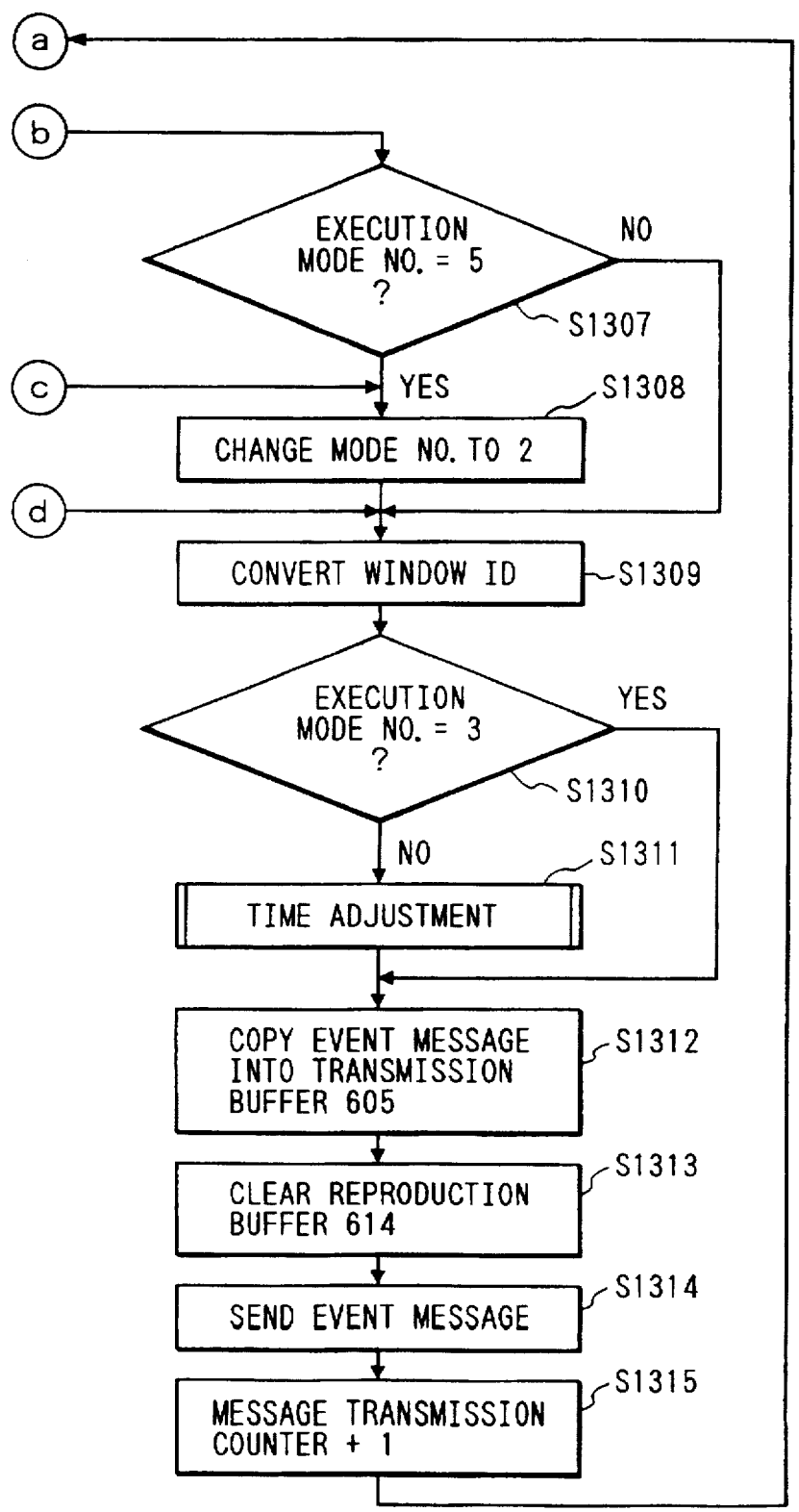
FIG. 13, which is comprised of FIGS. 13A and 13B, is a flowchart showing the operation of an event reproducing routine which is executed by an event message reproducer.
Figure 14:
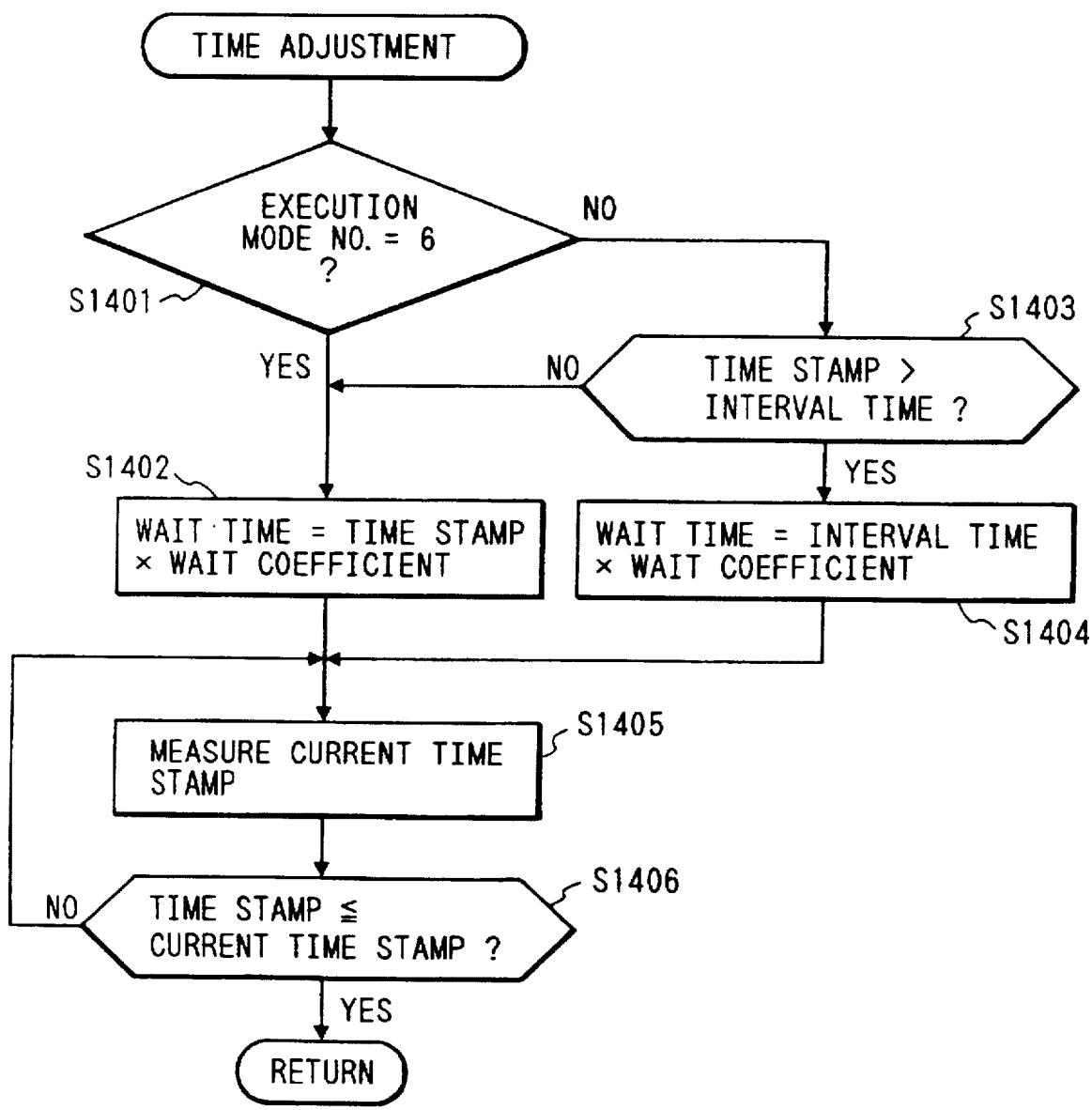
FIG. 14 is a flowchart showing the operation which is executed in a time adjusting routine.

The operation which is executed by the recorder/reproducer of the embodiment will now be described with reference to FIGS. 10 to 13B. FIG. 10 is a flowchart showing the operation which is executed by the recorder/reproducer of FIG. 6. FIG. 11 is a flowchart showing the operation of an event message recording routine which is executed by the event message recorder. FIG. 12 is a flowchart showing the operation of a window ID recording routine which is executed by the window ID recorder. FIGS. 13A and 13B are flowcharts showing the operation of an event message reproducing routine which is executed by the event message reproducer. FIG. 14 is a flowchart showing the operation which is executed in a time adjusting routine.

When the system is started, as shown in FIG. 10, first, the message transmission counter 606 is reset by the message communication manager 604 and the start time is measured by the time manager 607 (step S1001).

Subsequently, the window system server 100 is connected to the client application 103 (step S1002). When the message is received, the message is stored into the transmission message buffer 605 (step S1003).

A check is now made to see if the execution mode number is equal to 2 or more or not (step S1005). When the execution mode number is less than 2, namely, when it is equal to "1" or "0", the event message recording routine (step S1006) and the window ID recording routine (step S1007) are sequentially executed. After completion of the execution of the window ID recording routine, the message stored in the transmission message buffer 605 is transmitted to the partner side (step S1008). A count value of the message transmission counter 606 is increased by "1" (step S1009).

After the count value of the message transmission counter 604 was increased by "1", the processing routine is again returned to step S1003 and the next message is received.

When the execution mode number is equal to 2 or more (step S1005), the window ID recording routine is executed (step S1010).

After the window ID recording routine has been executed, the message in the transmission message buffer 605 is transmitted (step S1011), and the count value of the message transmission counter 606 is increased by "1".

The event message reproducing routine is subsequently executed (step S1013), and the processing routine is again returned (to step S1003).

The operation of the event message recording routine which is executed by the event message recorder 608 will now be described with reference to FIG. 11.

Referring now to FIG. 11, first, a check is made to see if the message stored in the transmission message buffer 605 is an event message generated by user input or not (step S1101). The term "event which is generated by user", input, again, refers to an event which is generated when there is a key input from the keyboard as an input device 101 or an-event which is generated when the button of the mouse as an input device 101 is pressed or when the mouse is moved.

When the message stored in the transmission message buffer 605 is not an event message generated by the user input, the processing routine escapes from this routine.

When the message stored in the transmission message buffer 605 is an event message generated by the user input, the count value of the transmission counter, time stamp, index flag, and contents of the event message are set to one unit and are sequentially recorded into the event message memory 609 in accordance with the recording format shown in FIG. 2 so as to be arranged in accordance with the event messages generated (steps S1102 to S1107). The index flag is set in accordance with the mode number stored in the execution mode number buffer 618. The set index flag is recorded into the event message memory 609. Specifically speaking, the index flag is set to ON and recorded when the execution mode number is equal to "1". The index flag is set to OFF and recorded when the execution mode number is equal to "0".

After the event message was recorded, the processing routine escapes from this routine.

The operation of the window ID recording routine which is executed by the window ID recorder 610 will now be described with reference to FIG. 12.

Referring to FIG. 12, first, a check is made to see if the message stored in the transmission message buffer 605 is a window making request message to request formation of a new window, from the client application 103 or not (step S1201). When the message is not such a window making request message, the processing routine escapes from the routine.

When the message is such a message, a check is made to see if the execution mode number is equal to 2 or more or not (step S1202). When the execution mode number is less than 2 (in the recording mode), the window ID is recorded in the first window ID memory 611 (step S1203). When the execution mode number is equal to 2 or more (in the reproducing mode), the window ID is recorded into the second window ID memory 612 (step S1204). The window ID to be recorded is a window ID which is included in the window making request message in the transmission message buffer 605 and is newly formed. Those window IDs are sequentially recorded in each of the first and second window ID memories 611 and 612 so as to be arranged in accordance with the windows formed.

After the window IDs have been stored into the first window ID memory 611, or after the window IDs have been stored into the second window ID memory 612, the processing routine escapes from the routine.

The operation of the event message reproducing routine which is executed by the event message reproducer will now be described with reference to FIGS. 13A and 13B.

Referring now to FIGS. 13A and 13B, a check is first made to see if the message to be reproduced has been prepared in the reproduction message buffer 614 or not (step S1301).

When the message to be reproduced was not prepared in the reproduction message buffer 614, the count value (hereinafter, referred to as a reproduction number) of the transmission counter, time stamp, index flag, and contents of the event message are read out from the event message memory 609 and are stored into the reproduction message buffer 614 (step S1302).

When the message to be reproduced has been stored in the reproduction message buffer 614 or when the message to be reproduced is stored, the reproduction number in the reproduction message buffer 614 is compared with the count value of the message transmission counter 606 at the current time point, thereby discriminating whether the reproduction number is equal to or less than the count value of the message transmission counter 606 or not (step S1303).

When the reproduction number is larger than the count value of the message transmission counter 606, the processing routine escapes from the routine.

When the reproduction number is equal to or less than the count value of the message transmission counter 606, the execution mode number is referred (steps S1304 to S1307).

When the execution mode number is equal to 2 (halt), the waiting state is continued until the execution mode is changed by the external input from the user (step S1304).

When the execution mode number is equal to 4 (skip reproduction), the index flag in the reproduction message buffer 614 is referred (step S1306). When the index flag is OFF, the window ID conversion is executed (step S1309). When the index flag is ON, the execution mode number in the execution mode number buffer 618 is changed to 2 (halt) (step S1308). After that, the window ID conversion is executed (step S1309).

When the execution mode number is equal to 5 (1-event reproduction), the execution mode number in the execution mode number buffer 618 is changed to 2 (halt) (step S1308). After that, the window ID conversion is executed (step S1309).

When the execution mode number is another number (3: normal reproduction, 6: reproduction with time adjustment, 7: digest reproduction), the window ID conversion is executed (step S1309).

In the window ID conversion, the window ID included in the event message in the reproduction message buffer 614 is converted by the window ID converter 615. The window IDs in the recording mode of the event message are sequentially recorded in the first window ID memory 611 in accordance with the making order of the windows. The window IDs of the windows formed at the present time point are recorded in the second window ID memory 612 in accordance with the making order of the windows. Therefore, the window ID converter 615 retrieves information at which identifying number in the first window ID memory 611 the window ID of the event message in the reproduction message buffer 614 has been recorded. The window ID in the second window ID memory 612 corresponding to the retrieved number is extracted. The portion of the window ID in the event message in the reproduction message buffer 614 is converted to the window ID extracted.

After completion of the conversion of the window ID, when the execution mode number is equal to 3 (normal reproduction), the event message in the reproduction message buffer 614 is stored in the transmission message buffer 605 (step S1312). The contents of the reproduction message buffer 614 are cleared (step S1313).

Subsequently, in the message communication manager 604, the event message in the transmission message buffer 605 is transmitted (step S1314). The count value of the message transmission counter 606 is increased by "1" (step S1315), and the processing routine is returned to step by "1", the processing routine is returned to step S1301.

After conversion of the window ID, when the mode number is equal to 6 (reproduction with time adjustment) or 7 (digest reproduction), the time adjusting routine is executed (step S1311). After completion of the execution of the time adjusting routine, the process from step S1312 is executed.

The operation which is executed by the time adjusting routine (step S1311) is performed by the time manager 607.

The operation which is executed by the time adjusting routine will now be described with reference to FIG. 14. The routine is executed when the execution mode number is equal to 6 or 7.

Referring now to FIG. 14, a check is first made to see if the execution mode number is equal to "6" or not (step S1401). When the execution mode number is equal to "6" (reproduction with time adjustment), the wait time is calculated (step S1402). The wait time is a value obtained by multiplying the time stamp in the reproduction message buffer 614 with a value stored in the wait coefficient memory 805. The wait time is stored into the wait time buffer 804.

When the execution mode number is not equal to "6", namely, when the execution mode number is equal to "7" (digest reproduction), the time stamp in the reproduction message buffer 614 is compared with the value (interval time) stored in the interval time memory 806, thereby judging whether the time stamp is larger than the interval time or not (step S1403).

When the time stamp is smaller than the interval time, the processing routine advances to step S1402 and the wait time is calculated in step S1402.

When the time stamp is larger than the interval time, the wait time is calculated by multiplying the interval time with the value stored in the wait coefficient memory 805 (step S1404). The wait time calculated here is stored into the wait time buffer 804.

After the wait time has been calculated, the current time stamp is measured and is stored into the time stamp buffer 803 (step S1405).

A check is now made to see if the value stored in the wait time buffer 804 is equal to or less than the value stored in the time stamp buffer 803 or not (step S1406). When the value stored in the wait time buffer 804 is equal to or less than the value stored in the time stamp buffer 803, the processing routine escapes from the routine.

When the value stored in the wait time buffer 804 is larger than the value stored in the time stamp buffer 803, the processing routine is again repeated from step S1405.

By the above processes, the reproducing speed adjusting function, pause function, and digest reproducing function are realized, and the operability at the time of the work reproduction can be improved.

In each of the above embodiments, although the recorder/reproducer has been constructed by one workstation (computer), the recorder/reproducer can be also be constructed by a plurality of computers connected via a network in place of one workstation. For example, by executing each means by an individual computer, the recorder/reproducer can be constructed by a plurality of computers connected through the network.

Although each of the above embodiments has been described with respect to the type of one client application, the invention can be also constructed so as to correspond to a plurality of client applications. In this case, by preparing a table for allocating numbers to a plurality of client applications and by managing the message keeping track of which one of the client applications it is for on the basis of the table, the invention can correspond to the plurality of client applications.

According to the invention as described above, the process to record the work contents so that they can be smoothly reconstructed can be executed without deteriorating the efficiency of the work which is being executed by the client application under activation at present. The process which corresponds to the recording process and is used to reconstruct the work contents can be efficiently executed.

[Third embodiment]

Figure 15B:
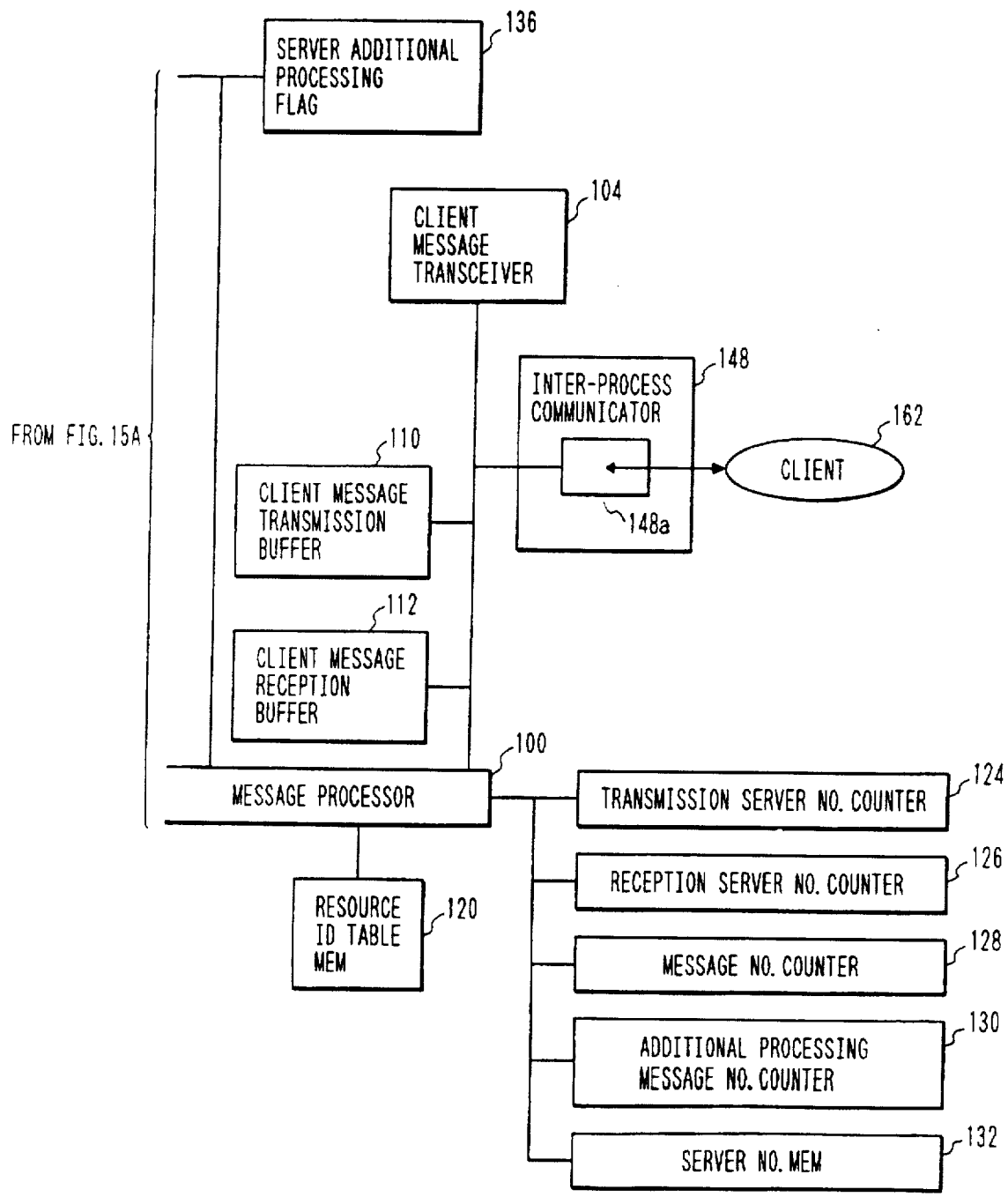
FIG. 15, which is comprised of FIGS. 15A and 15B, is a block diagram showing a construction of an information processing system according to the third embodiment of the invention.

The third embodiment of the invention will now be described hereinbelow with reference to the drawings. this embodiment will be explained with respect to a window shared system constructed by a plurality of computers connected through a network. FIGS. 15A and 15B are block diagrams showing a construction of a window shared system according to an embodiment of the invention. In the diagram, reference numeral 100 denotes a message processor for interpreting the message that is transmitted from the server or client and executing the process corresponding to the message. The message processor 100 includes: a resource ID recorder to record a resource ID (identifier) which appears in the message into a resource ID memory; a message recorder for recording the contents of the event message generated by user input that is transmitted from each server and the generating order of the event into the event memory; and a message converter for retrieving the value in the resource ID memory and converting a value of the resource identifier so that the event message recorded in the event message memory becomes a message from a new server.

Reference numeral 102 denotes a server message transceiver for receiving packets which are transmitted from the server, assembling them as a message, and transmitting a message to be transmitted to the server as a packet. Reference numeral 104 denotes a client message transceiver for receiving packets which are transmitted from the client, assembling them as a message, and transmitting a message to be transmitted to the client as a packet. Reference numeral 106 denotes a server message reception buffer for storing the message received from the server; 108 a server message transmission buffer for storing the message to be transmitted to the server; 110 a client message transmission buffer for storing the message to be transmitted to the client; and 112 a client message reception buffer for storing the message received from the client.

Reference numeral 114 denotes a transmission number memory for storing the number of the server as a transmission target; 116 a reception number memory for storing the number of the server which received the message; 118 an event message log memory for storing the event message by the user input which was received from the server; 120 a resource ID (identifier) table memory for storing the resource ID which appears in the message; 122 an event message number memory for storing the message number of the event log message in a standby state of the transmission; 124 a transmission server number counter for counting the number of servers to which the same message was transmitted when transmitting the same message to the servers; 126 a reception server number counter for counting the number of servers from which the same message was received when receiving the same message from the servers; and 128 a message number counter for counting the number of messages which are transmitted between the server and the client.

Reference numeral 130 denotes an additional processing message number counter for counting the number of messages which are transmitted between the server and the client during the additional process of the server; 132 a server number memory for storing the number of servers connected at present; 134 a command processor for interpreting the command to be inputted by the user for the system and executing the process corresponding to the command; 136 a server additional processing flag for indicating whether the additional process of the server is being executed or not; and 138 an inter-process communicator having a plurality of communication ports 138a, 138b, 138c, 138d, and 138e. The first communication port 138a is a communication port (for example, socket in the UNIX) to receive the command from the input device. The second communication port 138b is a communication port to communicate with a first server 154. The third communication port 138c is a communication port to communicate with a second server 156. The fourth communication port 138d is a communication port to communicate with an nth server 158. The fifth communication port 138e is a communication port to communicate with an additional server 160.

Reference numeral 148 denotes an inter-process communicator having one communication port 148a to communicate with a client 162; 150 an input device such as keyboard, mouse, or the like; 152 an output device such as a liquid crystal display or the like; 154 the first server (server process); 156 the second server (server process); 158 the nth server (server process); 160 the additional server (server process); and 162 the client (client process).

The operation of the window shared system in the embodiment with the above construction will now be described with reference to FIGS. 15A, 15B and 16 to 22.

Figure 16:
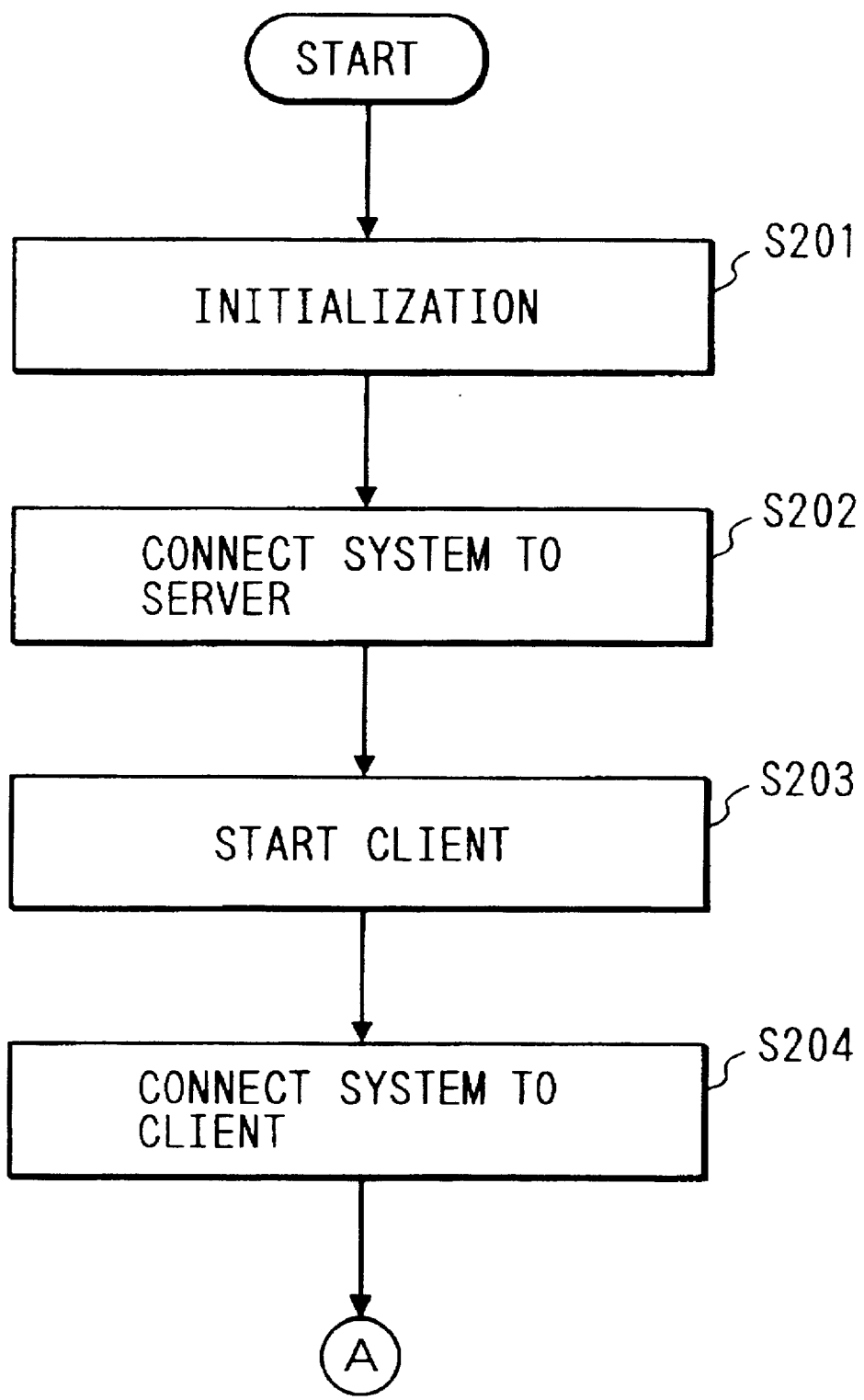
FIG. 16 is a flowchart showing a control procedure for processes upon activation in the information processing system according to the third embodiment.

FIG. 16 is a flowchart showing a control procedure for processes upon activation of the system. When the system is started, first in step S201, initializing processes (initialization) such as clear of the data in the memory, initialization of the counter, and the like is executed. In step S202, a connecting process to connect with the servers is executed. In this instance, it is assumed that the servers to be connected are previously given by factors or the like upon activation. By the connecting process in step S202, the first to the nth servers 154 to 158 and the second to the fourth communication ports 138b to 138d in FIG. 15A are connected, respectively. In step S203, the client 162 in FIG. 15B is activated. In step S204, the process to connect with the client 162 is executed. After that, the processing routine advances to processes in FIG. 17. By the connecting process in step S204, the client 162 in FIG. 15B is connected to the communication port 148a.

Figure 17:
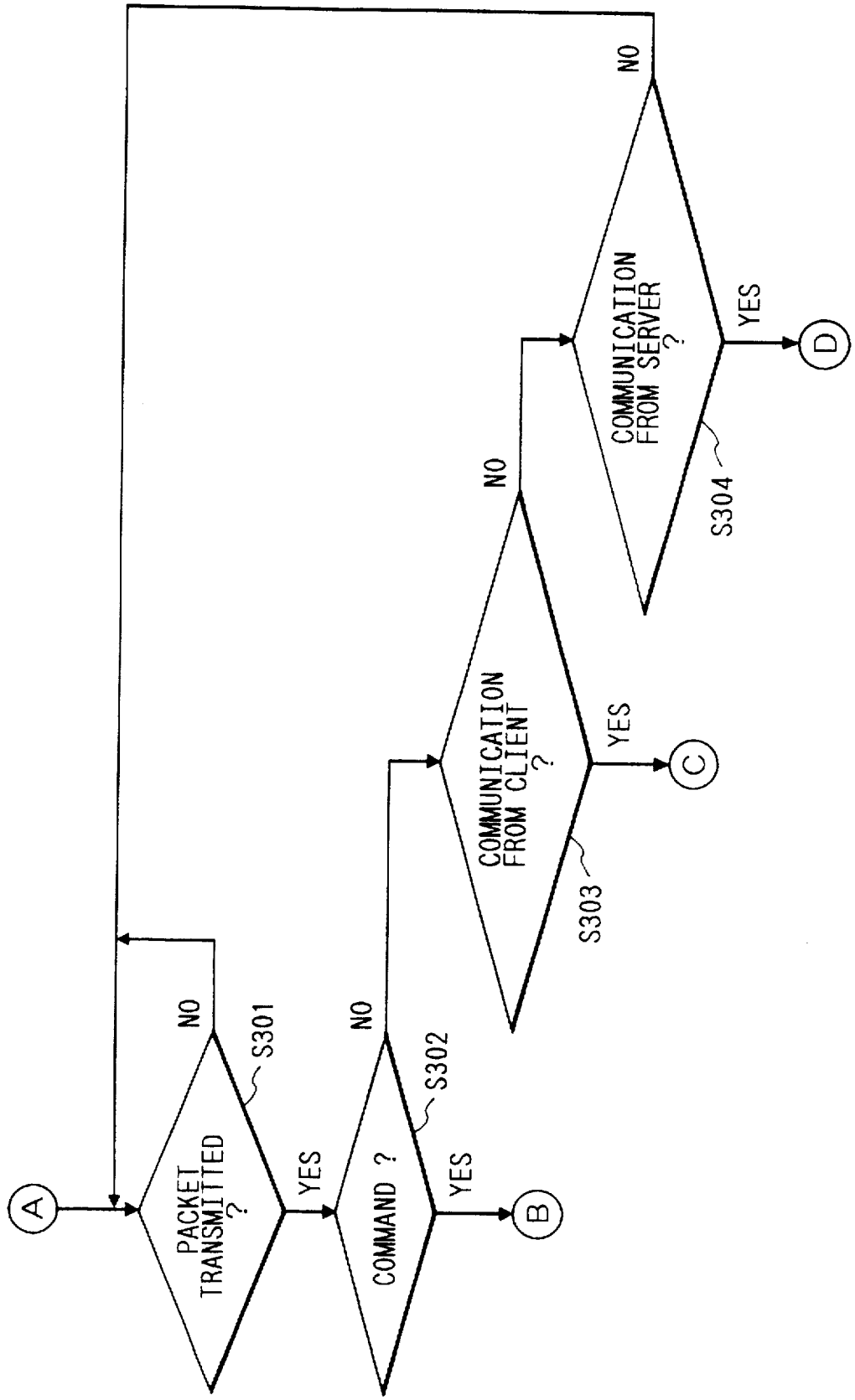
FIG. 17 is a flowchart showing a main routine of a control procedure for processes in the information processing system according to the third embodiment.

FIG. 17 is a flowchart showing a main loop of a control procedure of processes after the system was activated. First in step S301, a check is made to see if the packet has been transmitted to each communication port or not. In the case where the packet was transmitted, a check is made to see if there is a command input or not in step S302. If YES, the processing routine advances to processes in FIG. 18. If NO, step S303 follows. In step S303, a check is made to see if there is a communication from the client or not. If YES, the processing routine advances to processes in FIG. 19. If NO, step S304 follows. In step S304, a check is made to see if there is a communication from the server or not. If YES, the processing routine advances to processes in FIGS. 20 and 21. If NO, the processing routine is returned to step S301.

Figure 18:
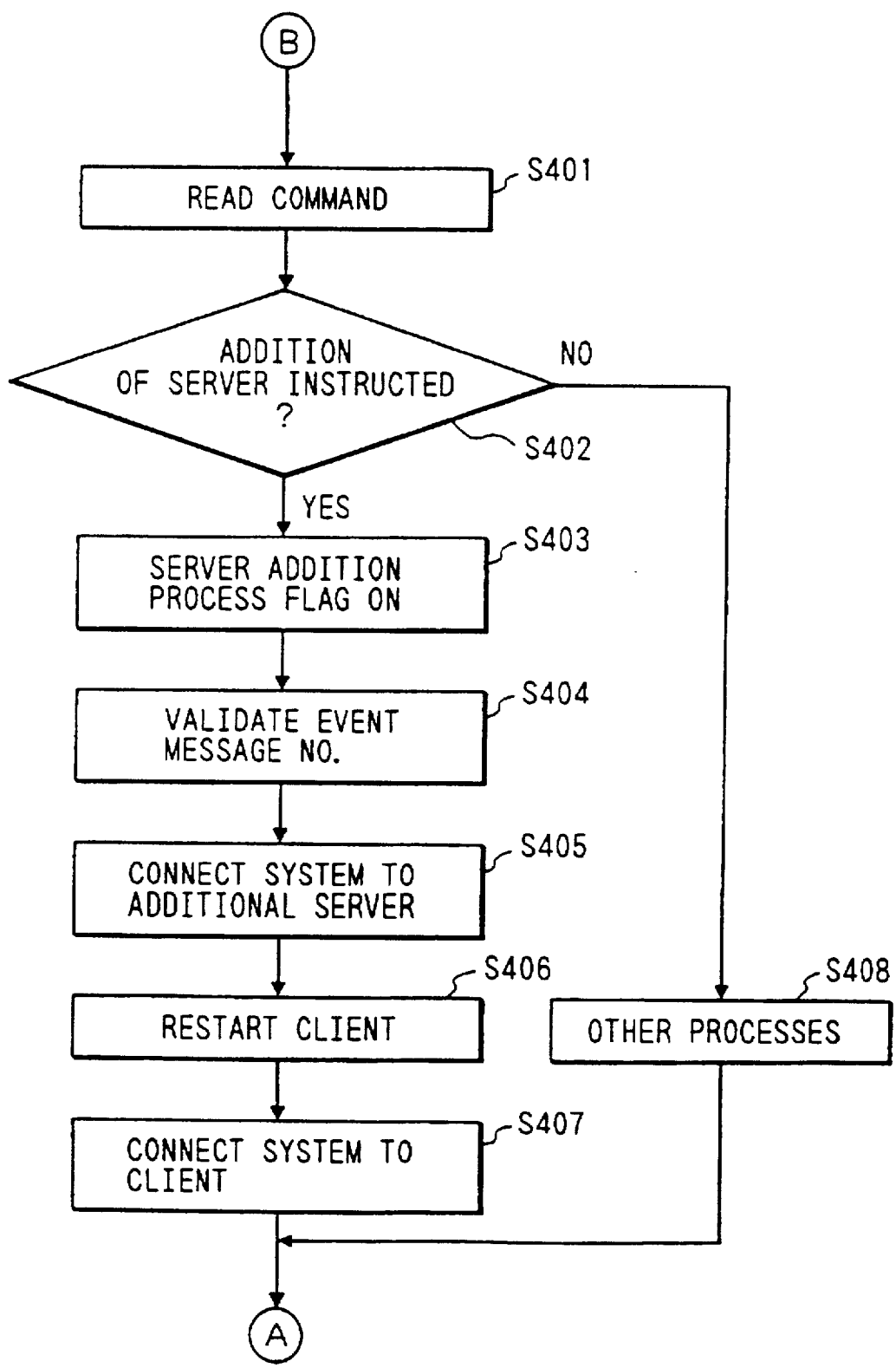
FIG. 18 is a flowchart showing a control procedure for processes in the case where there is a command input in the information processing system according to the third embodiment.

FIG. 18 is a flowchart showing a control procedure for processes in the case where there is a command input in the system. When a command is inputted, first in step S401, the command processor 134 reads the command through the communication port 138a in FIG. 15A. In step S402, the command read in step S401 is analyzed, thereby judging whether the command instructs the addition of a new server or not. If NO, another process is executed in step S408. After that, the processing routine advances to the processes in FIG. 17. When the command instructs the addition of a new server in step S402, a server addition process flag is set to ON in step S403. In step S404, a reading position in the event message log memory 118 in FIG. 15A is set to the head and the event message number is read and is written into the event message number memory 122 (the event message number is validated). A writing format of the data into the event message log memory 118 will be explained later with reference to FIGS. 23 and 24.

In step S405, the process to connect with the additional server 160 in FIG. 15A is executed. By the connecting process, the additional server 160 is connected to the communication port 138e. In step S406, the client 162 in FIG. 15B is restarted. In step S407, the process to connect with the client 162 which was restarted in step S406 is executed. After that, the processing routine advances to the processes in FIG. 17. By the connecting process in step S407, the client 162 in FIG. 15B is connected to the communication port 148a.

Figure 19:
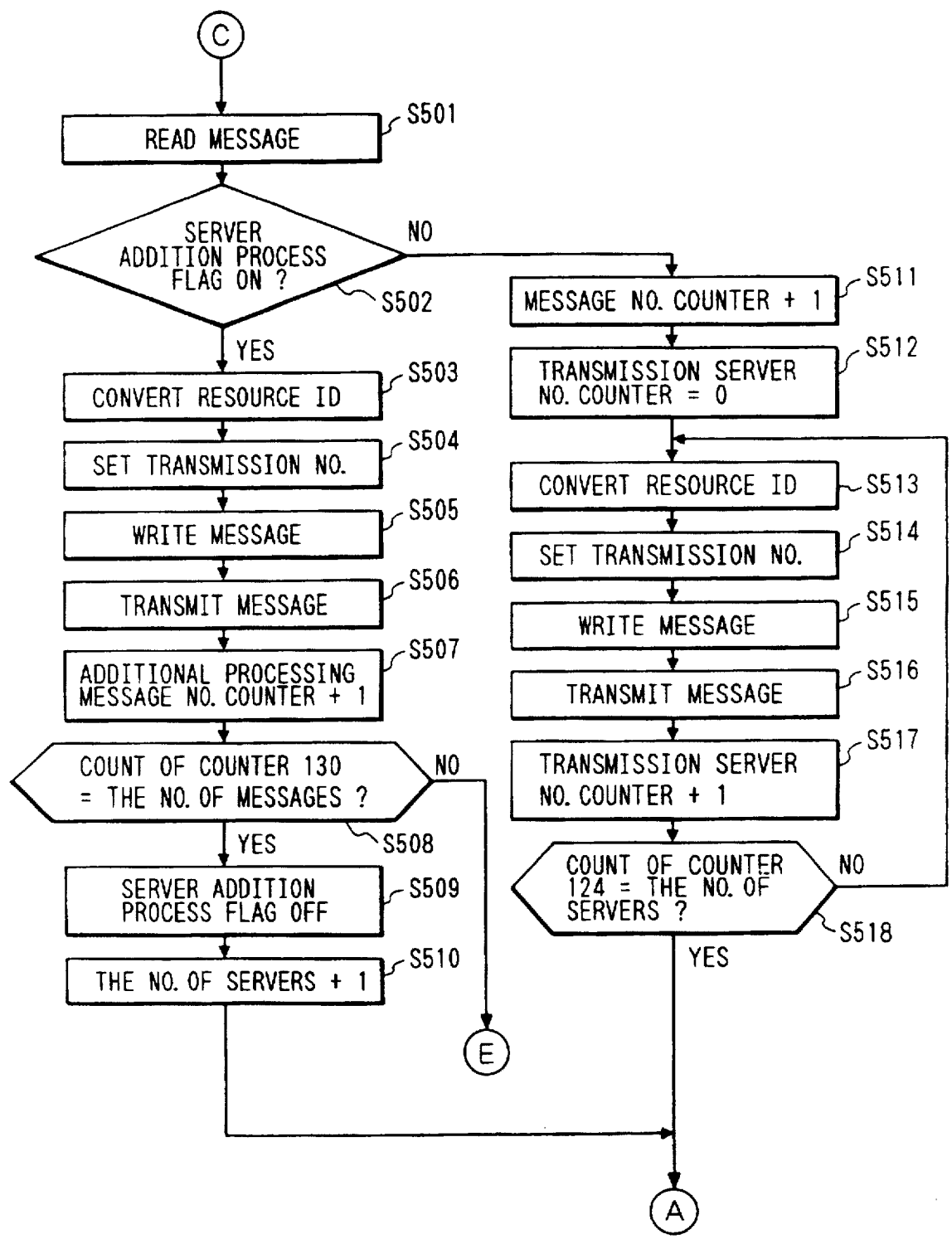
FIG. 19 is a flowchart showing a control procedure for processes in the case where a message from a client is received in the information processing system according to the third embodiment.

FIG. 19 is a flowchart showing a control procedure for processes when packets from the client are received in the system. First in step S501, the client message transceiver 104 writes the packets arrived from the client 162 into the client message reception buffer 112 (the message is read) until the message is completed. In step S502, a check is made to see if the server adding process is executed (the server addition process flag is ON) or not.

In the state of the server adding process, the resource ID table memory 120 is collated with the resource ID appearing in the client message reception buffer 112 in FIG. 15B, thereby performing the converting process in step S503. In step S504, the number of the server corresponding to the count value of the transmission server number counter 124 is written into the transmission number memory 114 in FIG. 15A (the transmission number is set). In step S505, the contents in the client message reception buffer 112 are written into the server message transmission buffer 108. In step S506, the message is transmitted to the additional server 160. After completion of the transmission of the message, the count value of the additional processing message number counter 130 is increased by "1" in step S507. In step S508, a check is made to see if the count value of the additional processing message number counter 130 is equal to the number of messages or not. If NO, the processing routine advances to processes in FIG. 22. When the count value of the additional processing message number counter 130 is equal to the number of messages in step S508, the server addition process flag is set to OFF in step S509. In step S510, the value in the server number memory 132 is increased by "1". After that, the processing routine advances to the processes in FIG. 17.

In step S502, when the server adding process is not executed, the count value of the message number counter 128 in FIG. 15B is increased by "1" in step S511. In step S512, the count value of the transmission server number counter 124 in FIG. 15B is set to "0". In step S513, in order to form the message to the server corresponding to the count value of the transmission server number counter 124, the resource ID appearing in the message is converted from the contents in the resource ID table memory 120 in FIG. 15B, respectively. The resource ID table will be described hereinlater. After completion of the conversion of the resource ID, in step S514, the number of the server corresponding to the count value of the transmission server number counter 124 is written into the transmission number memory 114 in FIG. 15A (the transmission number is set).

Subsequently, in step S515, the contents in the client message reception buffer 112 are written into the server message transmission buffer 108. In step S516, the message is transmitted. The message transmission is performed by the server message transceiver 102. The contents in the server message transmission buffer 108 are set to packets and are transmitted to the server corresponding to the value in the transmission number memory 114. After completion of the transmission of the message, in step S517, the message processor 100 in FIG. 15A increases the count value of the transmission server number counter 124 by "1". In step S518, a check is made to see if the count value of the transmission server number counter 124 coincides with the of servers or not. If NO, the processing routine is returned to step S513. When the count value of the transmission server number counter 124 is equal to the number of servers, the processing routine advances to the processes in FIG. 17.

Figure 20:
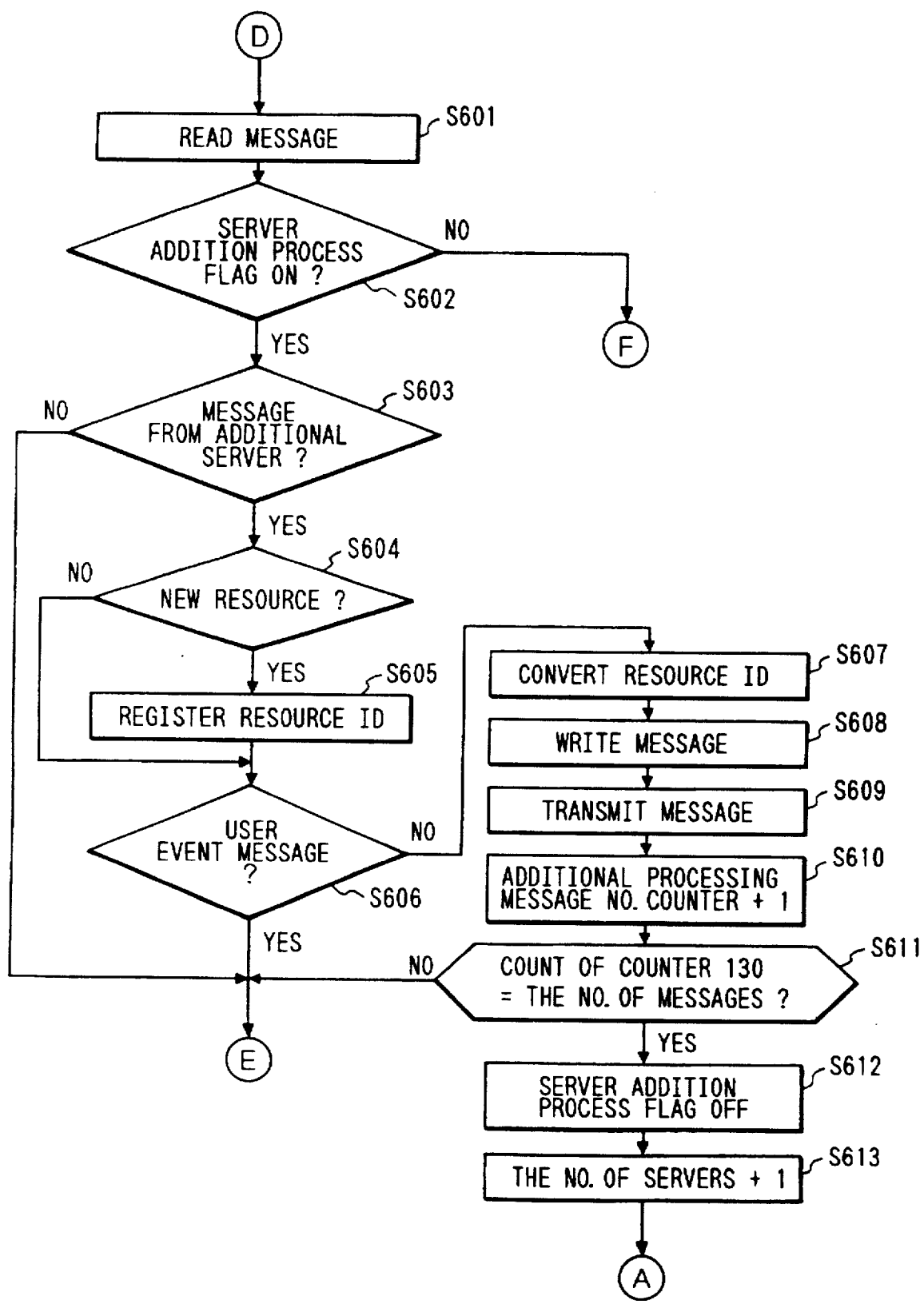
FIG. 20 is a flowchart showing a control procedure for processes in the case where a message from a server is transmitted in the information processing system according to the third embodiment.
Figure 21:
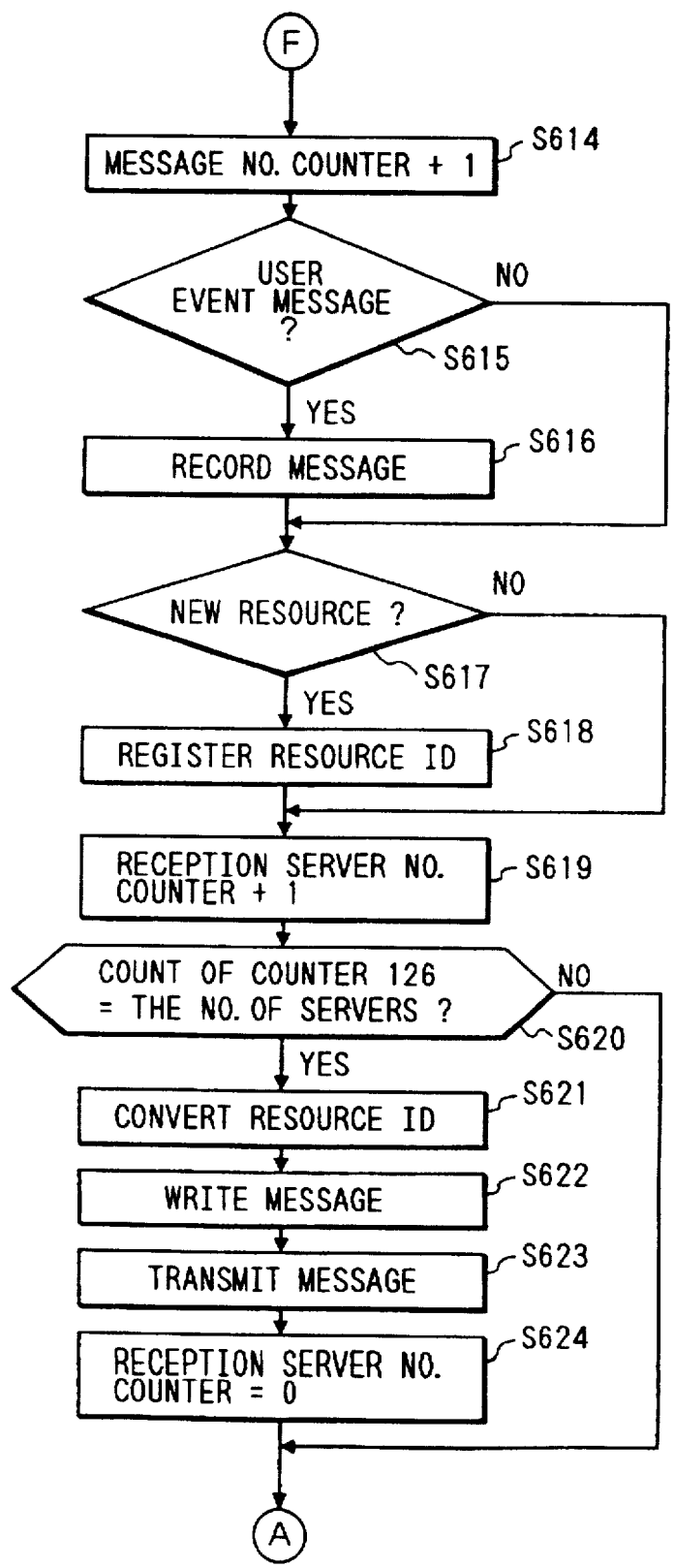
FIG. 21 is a flowchart showing a control procedure for processes in the case where a message from the server is transmitted in the information processing system according to the third embodiment.

FIGS. 20 and 21 are flowcharts showing a control procedure for processes in the case where the packets from the server are received in the system. First, when the packets from the server are received, in step S601 in FIG. 20, the server message transceiver 102 in FIG. 15A writes the packets into the server message reception buffer 106 in FIG. 15A (the message is read) until the message is completed. In this instance, the server corresponding to the server received is written into the reception number memory 116 in FIG. 15A. In step S602, a check is made to see if the server adding process is executed or not.

In the state of the server adding process, a check is made in step S603 to see if the message has arrived from the additional server 160 or not. If NO, the processing routine advances to the processes in FIG. 22. In the case of a message from the additional server 160, a check is made to see if there is a new resource or not in step S604. If YES, the resource ID is registered into the resource ID table memory 120 in FIG. 15B in step S605. After that, step S606 follows. When there is no new resource in step S604, the processing routine skips step S605 and advances to step S606.

A check is made in step S606 to see if the message in an event message resulting from user input or not. If YES, the processing routine advances to the processes in FIG. 22. When the message is not such an event message, the conversion of the resource ID in the message is executed in step S607. In step S608, the message is written into the client message transmission buffer 110 in FIG. 15B. In step S609, the client message transceiver 104 in FIG. 15B sets the message to the packets and transmits. After completion of the transmission, the count value of the additional processing message number counter 130 is increased by "1" in step S610. In step S611, a check is made to see if the count value of the additional processing message number counter 130 is equal to the of messages or not. If NO, the processing routine advances to the processes in FIG. 22. When the count value of the additional processing message number counter 130 is equal to the of messages, step S612 follows. In step S612, the server addition process flag is set to OFF. In step S613, the value in the server number memory 132 is increased by "1". After that, the processing routine advances to the processes in FIG. 22.

Figures 23, 24:
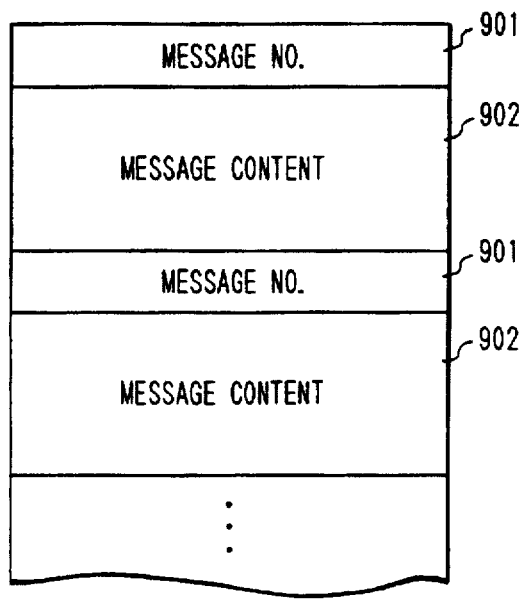
FIG. 23 is a diagram showing a storage form of an event message to be recorded in the information processing system according to the third embodiment.
FIG. 24 is a diagram showing a form of a resource ID table in the information processing system according to the third embodiment.

When the server adding process is not performed in step S602, the count value of the message number counter 128 in FIG. 15B is increased by "1" in step S614 in FIG. 21. In step S615, a check is made to see if the message read in step S601 is the event message of the user input or not. If YES, the message is recorded as a log into the event message log memory 118 in FIG. 15A in step S616. After that, step S617 follows. As shown in FIG. 23, as a method of recording the message in step S616, a pair of a message number 901 of the message to be recorded and contents 902 of the message is packed and recorded. The message number to be recorded is the count value of the message number counter 128 in FIG. 15B in the recording mode.

In step S615, when the message is not the event message of the user input, the processing routine skips step S616 and advances to step S617. A check is made in step S617 to see if there is a new resource or not by seeing the contents of the message. If YES, the new resource is registered into the resource ID table memory 120 in FIG. 15B in step S618. After that, step S619 follows. When there is no new resource in step S617, the processing routine skips step S618 and advances to step S619.

The resource ID table has a format as shown in FIG. 24. The resources are registered at the position corresponding to the server number of the server which transmitted the message in accordance with the appearing order of the resource ID. The server number is a value in the reception number memory 116 upon registration.

In step S619, the count value of the reception server number counter 126 in FIG. 15B is increased by "1". In step S620, a check is made to see if the count value of the reception server number counter 126 is equal to the of servers or not. If NO, the processing routine advances to the processes in FIG. 17. In step S620, when the count value of the reception server number counter 126 is equal to the number of servers, the resource ID in the message is converted in step S621. In step S622, the message is written into the client message transmission buffer 110 in FIG. 15B. In step S623, the client message transceiver 104 in FIG. 15B sets the contents in the client message transmission buffer 110 to packets and transmits. In step S624, the count value of the reception server number counter 126 in FIG. 15B is set to "0". After that, the processing routine advances to the processes in FIG. 17.

Figure 22:
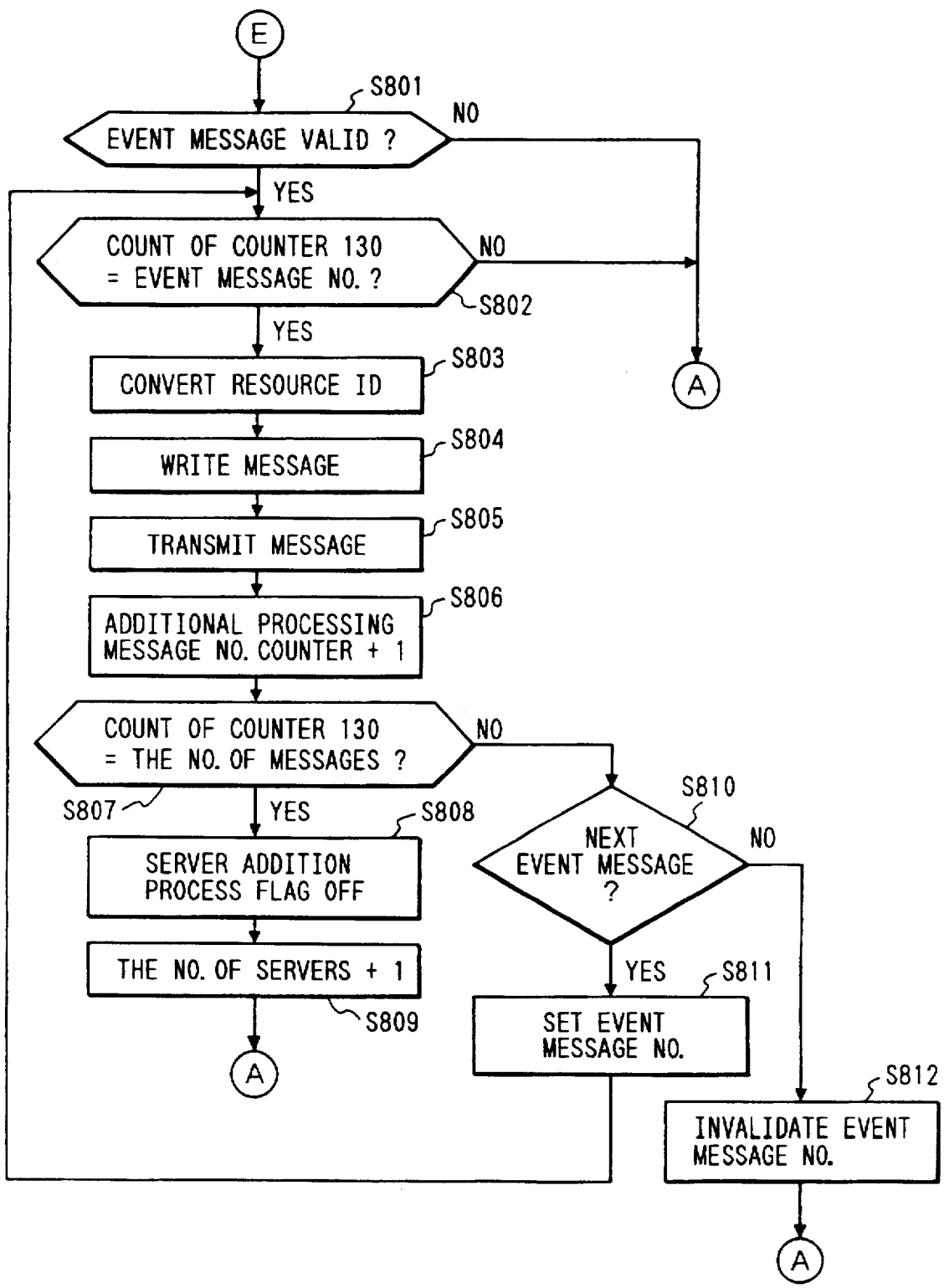
FIG. 22 is a flowchart showing a control procedure for processes in the case where an event message recorded is transmitted in the information processing system according to the third embodiment.

FIG. 22 is a flowchart showing a control procedure for a transmitting process of an event message log in the system. First in step S801, the value in the event message number memory 122 in FIG. 15A is seen, thereby checking whether the value is valid or not. When the event message number is invalid, the processing routine advances to the processes in FIG. 17. When it is valid, a check is made in step S802 to see if the event message number is equal to the count value of the additional processing message number counter 130 or not. When they are different, the processing routine advances to the processes in FIG. 17. When they are equal, in step S803, the resource ID in the message stored in the event message log memory 118 in FIG. 15A is converted. In step S804, the message is written into the client message transmission buffer 110 in FIG. 15B. In step S805, the client message transceiver 104 in FIG. 15B sets the message to packets and transmits.

After completion of the transmission of the message, in step S806, the count value of the additional processing message number counter 130 in FIG. 15B is increased by "1". In step S807, a check is made to see if the count value of the additional processing message number counter 130 is equal to the number of messages or not. If they are equal, the server addition process flag is set to OFF in step S808. In step S809, the value in the server number memory 132 in FIG. 15B is increased by "1". After that, the processing routine advances to the processes in FIG. 17.

When the count value of the additional processing message number counter 130 is not equal to the number of messages in step S807, a check is made in step S810 to see if there is a next event message registered from the event message log memory 118 in FIG. 15A or not. When the next registered event message exists, the event message number stored in the event message log memory 118 is written into the event message number memory 122 in FIG. 15A (the event message is set) in step S811. After that, the processing routine is returned to step S802. When the next registered event message doesn't exist in step S810, an invalid value is written into the event message number memory 122 in step S812. After that, the processing routine advances to the processes in FIG. 17.

By executing the above processes, the event message of the user input received from the server is recorded and the new server is allowed to transmit and receive the same message by using the record of the event message, thereby making it possible to set to the same state as that of the other server.

According to the information processing system of the invention as described in detail above, the event message of the user input received from the server is recorded and the recorded event message is transmitted at the time of the participation of the new user in the middle, so that the state at the time of the participation in the middle can be reconstructed without preserving the state by the user. Therefore, the state preserving processing step at the time of the participation in the middle by the user and the state reproduction processing step at the time of the participation in the middle can be deleted. The processes are executed by reconstructing only the event message of the user input. Thus, there is an effect such that the processing efficiency is improved.

What is claimed is:

1. An information processing apparatus for reproducing contents of a work which is executed on a window opened by a window system of a server client type, wherein said apparatus is operable in a plurality of reproducing modes including a digest reproducing mode, said apparatus comprising:

memory means for storing an event message which is generated by an input of a user and generation time information indicating a generation time of the event message, the event message and the generation time information being stored in correspondence to each other;

generating means for generating the event message stored in said memory means on the basis of the generation time information stored in correspondence to the event message; and reproducing means for reproducing the contents of the work on the basis of the event message generated by said generating means, wherein, in the digest reproducing mode, if a time interval between two of the event messages stored in said memory means reaches a predetermined value, said reproducing means reproduces the contents of the work by digesting a portion corresponding to the time interval.

2. An apparatus according to claim 1, further having message managing means for managing a communication of a message which is transmitted between a server and a client application.

3. An apparatus according to claim 1, further having:
   window identifier memory means for storing a window identifier in the event message; and
   converting means for converting the window identifier in the event message generated by said generating means.

4. An apparatus according to claim 1, wherein the event message by the user is not accepted when said reproducing means is reproducing the work contents.

5. An apparatus according to claim 1, wherein the generation time information of the event message is an absolute time.

6. An apparatus according to claim 1, wherein the generation time information of the event message is a relative time from a reference time at which the first event message is generated.

7. An apparatus according to claim 1, wherein when a reproducing mode by said reproducing means is a halt mode, the reproduction of the event message is halted.

8. An apparatus according to claim 1, wherein when a reproducing mode by said reproducing means is a reproducing speed designating mode, a reproducing speed of the event message is set and the event message is reproduced at the set reproducing speed.

9. An information processing method of reproducing contents of a work which is executed on a window opened by a window system of a server client type, wherein said method operates in a plurality of reproducing modes including a digest reproducing mode, said method comprising the steps of:

storing an event message which is generated by an input of a user and generation time information indicating a generation time of the event message, the event message and the generation time information being stored in correspondence to each other;

generating the event message stored on the basis of the generation time information stored in correspondence to the event message; and reproducing the contents of the work on the basis of the generated event message, wherein, in the digest reproducing mode, if a time interval between two of the stored event messages reaches a predetermined value, the contents of the work is reproduced by digesting a portion corresponding to the time interval.

10. A method according to claim 9, further comprising a message managing step of managing a communication of a message which is transmitted between a server and a client application.

11. A method according to claim 9, further comprising the steps of:

storing a window identifier in the event message; and converting the window identifier in the event message generated in said generating step.

12. A method according to claim 9, wherein the event message by the user is not accepted when the work contents are being reproduced in said reproducing step.

13. A method according to claim 9, wherein the generation time information of the event message is an absolute time.

14. A method according to claim 9, wherein the generation time information of the event message is a relative time from a reference time at which the first event message is generated.

15. A method according to claim 9, wherein when a reproducing mode in said reproducing step is a halt mode, the reproduction of the event message is halted.

16. A method according to claim 9, wherein when a reproducing mode in said reproducing step is a reproducing speed designating mode, a reproducing speed of the event message is set and the event message is reproduced at the set reproducing speed.

17. An information processing system for capturing messages which are transmitted between a plurality of servers and a client and for distributing the messages in a window system of a server client type, thereby allowing the plurality of servers to execute a same operation, said system comprising:

resource identifier recording means for recording a resource identifier appearing in the messages into a resource identifier memory;

message recording means for recording, into an event message memory, contents of an event message which is transmitted from each server and is generated by a user input, and a generating order of the event message;

command processing means for processing a command to add a new server during working; and message providing means for, if a new server participates, providing the new server with the contents of the event messages recorded by said message recording means, so as to place the new server in the same condition as the plurality of servers.

18. A system according to claim 17, further comprising:

message number counting means for counting the orders of the events when recording a log;

an additional processing message number counting means for counting the orders of the events when reproducing the log; and transmission control means for comparing a count value of said message number counting means with a count value of said additional processing message number counting means, thereby controlling so as to transmit the event messages recorded in said event message memory in accordance with the correct order.

* * * * *

UNITED STATES PATENT AND TRADEMARK OFFICE
CERTIFICATE OF CORRECTION

PATENT NO. : 5,894,553
DATED : April 13, 1999
INVENTOR(S) : TAKESHI KAWAZOME, ET AL. Page 1 of 4

It is certified that error appears in the above-identified patent and that said Letters Patent is hereby corrected as shown below:

AT [57] ABSTRACT

Line 3, "doesn't" should read --does not--.

COLUMN 1

Line 21, "keyboard" should read --a keyboard,--;
    Line 60, "application to reconstruct the work" should read --application.--; and
    Line 61, "saving/loading function has." should be deleted.

COLUMN 2

Line 6, "doesn't" should read --does not--;
    Line 14, "doesn't" should read --does not--;
    Line 32, "client because of the operation of the" should read --client, as this operation--; and
    Line 33, "halfway participation and the operation for this purpose" should be deleted.

COLUMN 4

Line 34, "115," should read --115, and a relative--;
    Line 38, "event" should read --"event--;
    Line 49, "ID" should be deleted; and
    Line 51, "so" should be deleted, and "ID" should read --ID so--.

UNITED STATES PATENT AND TRADEMARK OFFICE
CERTIFICATE OF CORRECTION

PATENT NO. : 5,894,553

DATED : April 13, 1999

INVENTOR(S) : TAKESHI KAWAZOME, ET AL.

It is certified that error appears in the above-identified patent and that said Letters Patent is hereby corrected as shown below:

COLUMN 6

Line 10, "The" should read --the--.

COLUMN 7

Line 13, "transmission;" should read --transmission--; and
    Line 16, "was" should read --has been--.

COLUMN 8

Line 5, "relative interval, or" should read --interval, or relative--;
    Line 17, "transmission counter 115 was increased, the pro-" should be deleted; and
    Line 18, "cessing" should be deleted.

COLUMN 9

Line 51, "No." should read --number--;
    Line 56, "command." should read --command. ¶-- and "made" should read --made to--; and
    Line 58, "made correspond" should read --corresponds--.

COLUMN 10

Line 6, "is made correspond" should read --corresponds--.

UNITED STATES PATENT AND TRADEMARK OFFICE
CERTIFICATE OF CORRECTION

PATENT NO. : 5,894,553
DATED : April 13, 1999
INVENTOR(S) : TAKESHI KAWAZOME, ET AL.

It is certified that error appears in the above-identified patent and that said Letters Patent is hereby corrected as shown below:

COLUMN 11

Line 29, "user", input," should read --user input",--;
    Line 32, "an-event" should read --an event--; and
    Line 60, "message" should read --message,--.

COLUMN 13

Line 6, "at which identifying" should read --identifying at which--;
    Line 24, "by "1"," should be deleted;
    Line 25, "the processing routine is returned to step" should be deleted; and
    Line 54, "S1402" should read --S1402,--.

COLUMN 14

Line 12, "can be" should read --can--; and
    Line 36, "this" should read --This--.

COLUMN 15

Line 59, "clear" should read --clearing--.

COLUMN 17

Line 41, "of" should be deleted.

UNITED STATES PATENT AND TRADEMARK OFFICE
CERTIFICATE OF CORRECTION

PATENT NO. : 5,894,553

DATED : April 13, 1999

INVENTOR(S) : TAKESHI KAWAZOME, ET AL.

It is certified that error appears in the above-identified patent and that said Letters Patent is hereby corrected as shown below:

COLUMN 18

Line 12, "the of" should read --the number of--;
    Line 15, "the of" should read --the number of--; and
    Line 51, "the of" should read --the number of--.

Signed and Sealed this

Fourteenth Day of December, 1999

Q. TODD DICKINSON

Attesting Officer     Acting Commissioner of Patents and Trademarks